United States Patent
Komiya et al.

(10) Patent No.: US 10,582,183 B2
(45) Date of Patent: *Mar. 3, 2020

(54) IMAGE ENCODING METHOD, IMAGE DECODING METHOD, IMAGE ENCODING DEVICE, AND IMAGE DECODING DEVICE

(71) Applicant: Sun Patent Trust, New York, NY (US)

(72) Inventors: Daisaku Komiya, Tokyo (JP); Takahiro Nishi, Nara (JP); Youji Shibahara, Tokyo (JP); Kyoko Tanikawa, Osaka (JP); Hisao Sasai, Osaka (JP); Toshiyasu Sugio, Osaka (JP); Kengo Terada, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,265

(22) Filed: Jun. 20, 2018

(65) Prior Publication Data

US 2018/0302607 A1 Oct. 18, 2018

Related U.S. Application Data

(63) Continuation of application No. 15/602,824, filed on May 23, 2017, now Pat. No. 10,027,943, which is a
(Continued)

(51) Int. Cl.
*H04N 13/00* (2018.01)
*H04N 13/161* (2018.01)
(Continued)

(52) U.S. Cl.
CPC .......... *H04N 13/161* (2018.05); *H04N 19/33* (2014.11); *H04N 19/46* (2014.11); *H04N 19/597* (2014.11); *H04N 19/70* (2014.11)

(58) Field of Classification Search
CPC .... H04N 19/597; H04N 19/70; H04N 13/161; H04N 13/0048; H04N 19/33; H04N 19/46

See application file for complete search history.

(56) References Cited

U.S. PATENT DOCUMENTS

| 8,774,266 B2 | 7/2014 | Wang et al. |
| 2002/0051581 A1 | 5/2002 | Takeuchi et al. |

(Continued)

FOREIGN PATENT DOCUMENTS

| JP | 2002-10251 | 1/2002 |
| JP | 2008-536420 | 9/2008 |

(Continued)

OTHER PUBLICATIONS

International Search Report dated Jun. 25, 2013 in International Application No. PCT/JP2013/002230.
(Continued)

*Primary Examiner* — Zhihan Zhou
(74) *Attorney, Agent, or Firm* — Wenderoth, Lind & Ponack, L.L.P.

(57) ABSTRACT

An image encoding method according to an aspect of the present invention includes: generating, from a plurality of first sub-bitstreams which are obtained by encoding a plurality of images on a per layer basis according to spatial scalable image encoding, a second sub-bitstream including two or more first sub-bitstreams corresponding to two or more layers, the two or more first sub-bitstreams being included in the plurality of first sub-bitstreams; and generating a descriptor including a first field indicating a minimum value for two or more layer identifiers indicating the two or more layers and a second field indicating a maximum value for the two or more layer identifiers.

2 Claims, 34 Drawing Sheets

SVC extension descriptor

| Field name | Bit length |
| --- | --- |
| descriptor_tag | 8 |
| descriptor_length | 8 |
| width | 16 |
| height | 16 |
| frame_rate | 16 |
| average_bitrate | 16 |
| maximum_bitrate | 16 |
| dependency_id | 3 |
| reserved | 5 |
| quality_id_start | 4 |
| quality_id_end | 4 |
| temporal_id_start | 3 |
| temporal_id_end | 3 |
| no_sei_nal_unit_present | 1 |
| reserved | 1 |

Related U.S. Application Data continuation of application No. 14/389,453, filed as application No. PCT/JP2013/002230 on Apr. 1, 2013, now Pat. No. 9,693,032.

(60) Provisional application No. 61/619,456, filed on Apr. 3, 2012.

(51) Int. Cl.
*H04N 19/70* (2014.01)
*H04N 19/46* (2014.01)
*H04N 19/33* (2014.01)
*H04N 19/597* (2014.01)

(56) References Cited

U.S. PATENT DOCUMENTS

| | | | |
|---|---|---|---|
| 2006/0256851 A1 | 11/2006 | Wang et al. | |
| 2010/0020871 A1* | 1/2010 | Hannuksela | H04N 21/438 375/240.12 |
| 2011/0032999 A1* | 2/2011 | Chen | H04N 21/234327 375/240.26 |
| 2012/0269275 A1* | 10/2012 | Hannuksela | H04N 19/597 375/240.25 |
| 2013/0135431 A1* | 5/2013 | Chen | H04N 19/597 348/42 |
| 2013/0135433 A1* | 5/2013 | Chen | H04N 19/597 348/43 |

FOREIGN PATENT DOCUMENTS

| | | |
|---|---|---|
| JP | 2010-507961 | 3/2010 |
| WO | 2006/108917 | 10/2006 |
| WO | 2008/051041 | 5/2008 |

OTHER PUBLICATIONS

"ISO/IEC 13818-1 Second edition, Information technology—Generic coding of moving pictures and associated audio information: Systems", Dec. 1, 2000.

Jill Boyce et al., Extensible High Layer Syntax for Scalability, Joint Collaborative Team on Video Coding (JCT-VC) of ITU-T SG16 WP3 and ISO/IEC JTC1/SC29/WG11, 5th Meeting: Geneva, CH, JCTVC-E279, ITU-T, 2011.03.22, p. 1-10.

Extended European Search Report dated Mar. 5, 2015 in corresponding European patent application No. 13773076.8.

Annoymous: "Text of ISO/IEC 14496-15 2nd edition", 91. MPEG Meeting: Jan. 18, 2010 to Jan. 22, 2010; Kyoto; (Motion Picture Expertgroup or ISO/IEC JTC1/SC29/WG11), No. N11139, Jan. 22, 2010, XP030017636, ISSN: 0000-0030 sections C.1, C.2.4, C.2.11, F.8.3.

Hannuksela et al: "Scalable multi-view video coding", 27. JVT Meeting; Jun. 4, 2008 to Oct. 4, 2008; Geneva, (Joint Video Team OFISO/IEC JTC1/SC29/WG11 and ITU-T SG.16), No. JVT-AA044, Apr. 24, 2008, XP030007387, ISSN: 0000-0091.

\* cited by examiner

FIG. 1

SVC extension descriptor

| Field name | Bit length |
|---|---|
| descriptor_tag | 8 |
| descriptor_length | 8 |
| width | 16 |
| height | 16 |
| frame_rate | 16 |
| average_bitrate | 16 |
| maximum_bitrate | 16 |
| dependency_id | 3 |
| reserved | 5 |
| quality_id_start | 4 |
| quality_id_end | 4 |
| temporal_id_start | 3 |
| temporal_id_end | 3 |
| no_sei_nal_unit_present | 1 |
| reserved | 1 |

FIG. 3

MVC extension descriptor

| Field name | Bit length |
|---|---|
| descriptor_tag | 8 |
| descriptor_length | 8 |
| average_bitrate | 16 |
| maximum_bitrate | 16 |
| reserved | 4 |
| view_order_index_min | 10 |
| view_order_index_max | 10 |
| temporal_id_start | 3 |
| temporal_id_end | 3 |
| no_sei_nal_unit_present | 1 |
| no_prefix_nal_unit_present | 1 |

FIG. 14

SVC-MVC extension descriptor

| Field name | Bit length |
|---|---|
| descriptor_tag | 8 |
| descriptor_length | 8 |
| width | 16 |
| height | 16 |
| frame_rate | 16 |
| average_bitrate | 16 |
| maximum_bitrate | 16 |
| dependency_id_start | 3 |
| dependency_id_end | 3 |
| reserved | 2 |
| quality_id_start | 4 |
| quality_id_end | 4 |
| view_order_index_min | 10 |
| view_order_index_max | 10 |
| temporal_id_start | 3 |
| temporal_id_end | 3 |
| no_sei_nal_unit_present | 1 |
| no_prefix_nal_unit_present | 1 |
| reserved | 4 |

FIG. 23

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 26
Stream of TS packets
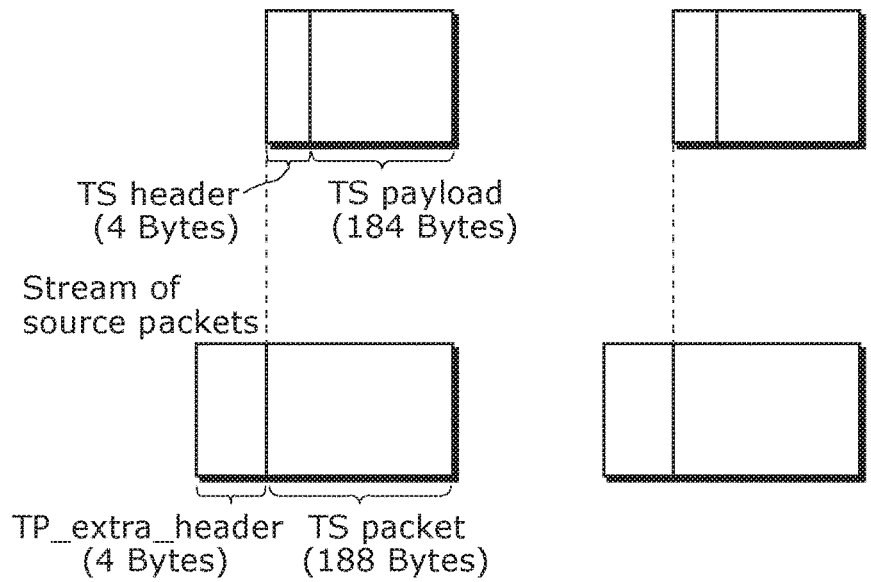
Multiplexed data
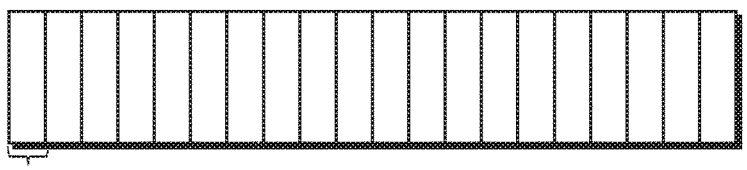
FIG. 27
Data structure of PMT
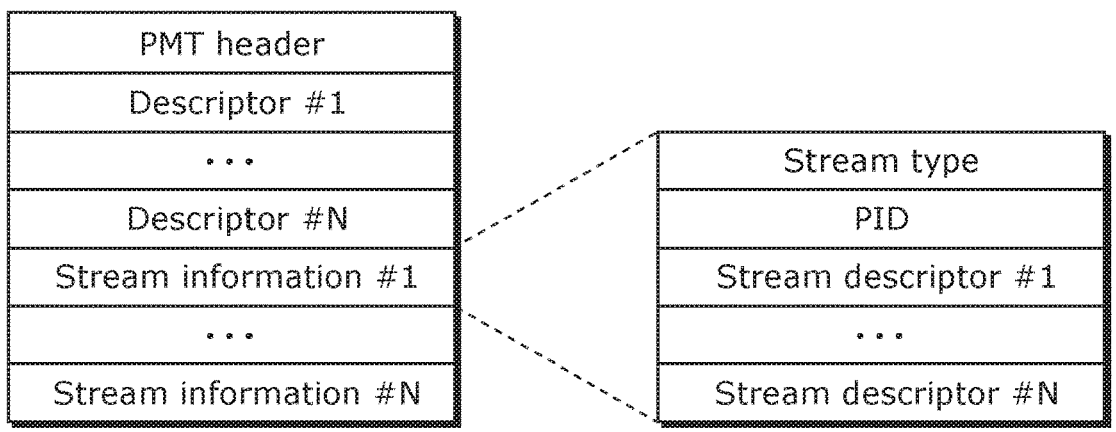

| Corresponding standard | Driving frequency |
|---|---|
| MPEG-4 AVC | 500 MHz |
| MPEG-2 | 350 MHz |
| ⋮ | ⋮ | ex900

IMAGE ENCODING METHOD, IMAGE DECODING METHOD, IMAGE ENCODING DEVICE, AND IMAGE DECODING DEVICE

TECHNICAL FIELD

The present invention relates to an image encoding method for encoding images.

BACKGROUND ART

As a technique related to an image encoding method for encoding images, a technique is disclosed in Non Patent Literature 1.

CITATION LIST

Non Patent Literature

[NPL 1]
ISO/IEC 13818-1

SUMMARY OF INVENTION

Technical Problem

However, when sub-bitstreams generated in image encoding have a low flexibility, it is difficult to perform efficient processing.

In view of this, the present invention provides an image encoding method for generating sub-bitstreams having a high flexibility.

Solution to Problem

An image encoding method according to an aspect of the present invention includes: generating, from a plurality of first sub-bitstreams which are obtained by encoding a plurality of images on a per layer basis according to spatial scalable image encoding, a second sub-bitstream including two or more first sub-bitstreams corresponding to two or more layers, the two or more first sub-bitstreams being included in the plurality of first sub-bitstreams; and generating a descriptor including a first field indicating a minimum value for two or more layer identifiers indicating the two or more layers and a second field indicating a maximum value for the two or more layer identifiers.

These general and specific aspects may be implemented using a system, a device, an integrated circuit, a computer program, or a non-transitory computer-readable recording medium such as a CD-ROM, or any combination of systems, devices, integrated circuits, computer programs, or computer-readable recording media.

Advantageous Effects of Invention

An image encoding method according to an aspect of the present invention is capable of generating sub-bitstreams having a high flexibility.

BRIEF DESCRIPTION OF DRAWINGS

FIG. 1 is a diagram illustrating SVC extension descriptors according to a reference example.

FIG. 3 is a diagram illustrating MVC extension descriptors according to a reference example.

FIG. 14 is a diagram illustrating SVC-MVC extension descriptors according to Embodiment 1.

FIG. 23 illustrates a structure of multiplexed data.

FIG. 26 shows a structure of TS packets and source packets in the multiplexed data.

FIG. 27 shows a data structure of a PMT.

DESCRIPTION OF EMBODIMENTS (Underlying Knowledge Forming Basis of the Present Disclosure)

The Inventors found the following problems related to the image encoding device which encodes video, described in the "Background Art" section.

A video and audio bitstream includes header information such as frame sizes and display time added thereto. The bitstream is subject to system multiplexing, and is then transmitted. As a system multiplexing method, an MEPG-2 system defined in the ISO/IEC 13181-1 is generally used.

The MEPG-2 system defines two kinds of multiplexing formats which are a transport stream and a program stream. The transport stream is designed to be applied to an environment in which a transmission error occurs, and corresponds to a bitstream which is used mainly for broadcasting. On the other hand, the program stream is designed to be applied to an environment in which no error occurs, and corresponds to a bitstream which is used mainly for storage media such as DVDs.

In the case of the MPEG-2 transport stream, data items are transmitted using packets each having a fixed length of 188 bytes called transport stream (TS) packets. The video and audio encoded data items are multiplexed into Packetized Elementary Stream (PES) packets, and are then divided into appropriate sizes, and are inserted into the payloads of the TS packets.

In addition, information items related to the program are multiplexed in a data structure called a section, and are divided into appropriate sizes, and are inserted into the payloads of the TS packets. Next, the resulting TS packets are arranged to compose a transport stream.

The section includes a Program Association Table (PAT), a Program Map Table (PMT), and a Program Stream Map (PSM) which include program list information. The MPEG-2 system makes it possible to store bitstream attribute information such as a bit rate and a frame rate into a unit called a descriptor, and transmit the bitstream attribute information included in a PMT or a PSM.

In general, the information included in the descriptor is information also included in the video and audio encoded data. With the descriptor included in the PMT or PSM, a system layer can be notified of the details of encoded data, and determine whether or not the encoded data can be decoded, at the time of receiving program information.

The ITU-T H.222.0 Amendment 3 (Transport of scalable video over Rec. ITU-T H.222.0|ISO/IEC 13818-1) defines extension for transmitting data (SVC data) obtained in scalable video encoding using the MPEG-2 system.

FIG. 1 illustrates SVC extension descriptors including information related to scalability and re-assembly of a video sub-bitstream. The video sub-bitstream constitutes a part of a video stream which is obtained in scalable video encoding. All of NAL units which constitute a video sub-bitstream includes a value of identical dependency_id.

Figure 2:
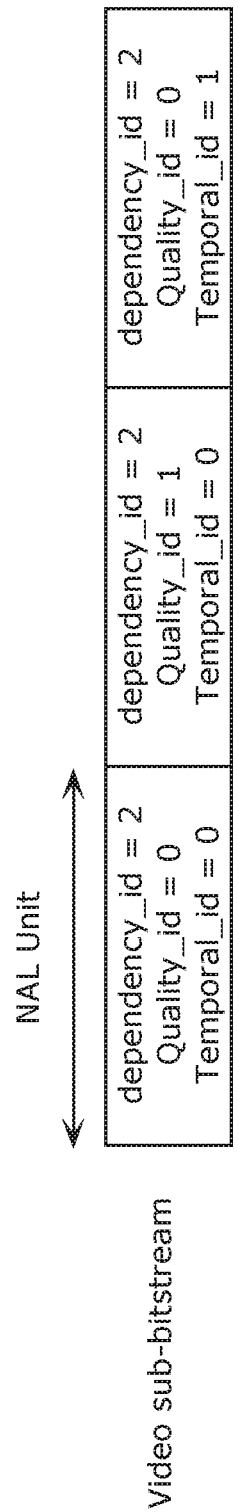
FIG. 2 is a diagram illustrating a video sub-bitstream according to a reference example.

FIG. 2 illustrates examples of the video sub-bitstreams. The video sub-bitstreams illustrated in FIG. 2 are composed of NAL units having 2 as a value of dependency_id. Here, the dependency_id is an identifier indicating a hierarchical layer of spatial scalable video encoding. In the already standardized video encoding method called H.264, a NAL unit header including SVC data is extended, and the dependency_id is included in the SVC extension part of the NAL unit header.

Next, fields included in SVC extension descriptors are described. A field as descriptor_tag is an identifier for identifying a descriptor, and an SVC extension descriptor has 48 assigned thereto. A field as descriptor_length indicates the size of the descriptor. Fields as width and height indicate a maximum size for images in a video stream. A field as frame_rate indicates a maximum frame rate for the video stream.

A field as average_bitrate indicates an average bit rate of the video stream. A field as maximum_bitrate indicates a maximum bit rate for the video stream. As described above, the dependency_id is the value of dependency_id of the NAL unit headers of the NAL units composing the video sub-bitstream.

A field as quality_id_start indicates a minimum value for quality_id of NAL unit headers of the NAL units composing the video sub-bitstream. A field as quality_id_end indicates a maximum value for quality_id of NAL unit headers of the NAL units composing the video sub-bitstream. In other words, as the values of quality_id, the NAL units including values from quality_id_start to quality_id_end are included in the video sub-bitstream.

Likewise, fields as temporal_id_start and temporal_id_end respectively indicate minimum and maximum values for temporal_id of the NAL unit headers of the NAL units composing the video sub-bitstream.

A field as no_sei_nal_unit_present is a flag indicating whether or not the video sub-bitstream includes a NAL unit of a Supplemental Enhancement Information (SEI). When the value of no_sei_nal_unit_present is 1, it is shown that the video sub-bitstream does not include any NAL unit of SEI.

The ITU-T H.222.0 Amendment 4 (Transport of multiview video over Rec. ITU-T H.222.0|ISO/IEC 13818-1) defines extension for transmitting data (MVC data) which is obtained by multiview video encoding, using the MPEG-2 system.

FIG. 3 illustrates MVC extension descriptors including information related to MVC video sub-bitstreams and re-assembly of the MVC video sub-bitstreams.

An MVC video sub-bitstream constitutes a part of a video stream which is obtained through multiview video encoding. The NAL unit composing the MVC video sub-bitstream has a value of View_Id included in a view ID set (MVC View_Id Subset). The view ID set (MVC View_Id Subset) is one or more View_Id sets.

Figure 4:
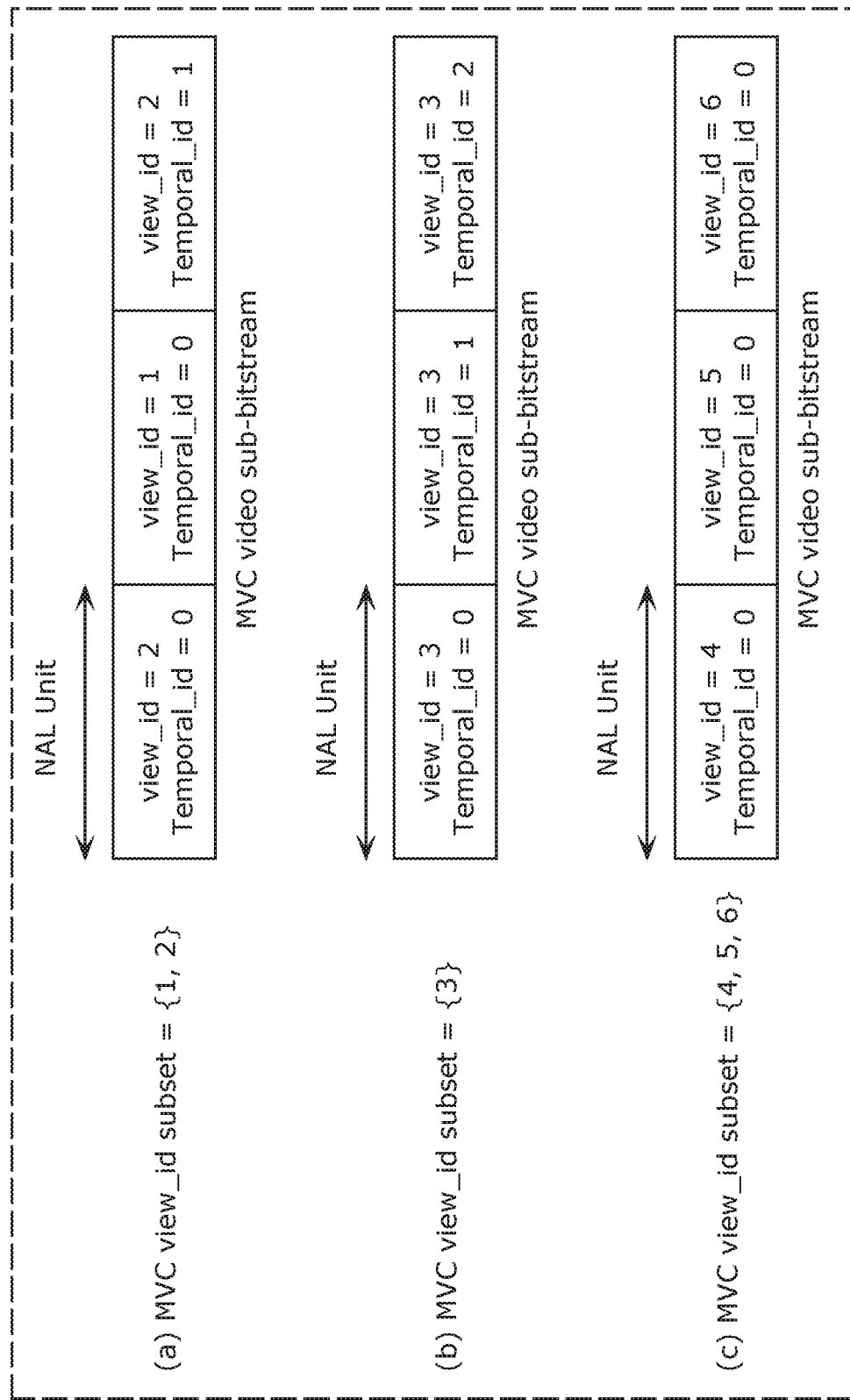
FIG. 4 is a diagram illustrating a view ID set (MVC view_id subset) according to a reference example.

FIG. 4 illustrates examples of view ID sets (MVC view_id subset). The view ID set (MVC view_id subset) in (a) of FIG. 4 is a set of view_id having a value of 1 and view_id having a value of 2. The MVC video sub-bitstream in (a) of FIG. 4 is composed only of NAL units each having view_id with a value of 1 or 2.

The view ID set (MVC View_Id Subset) in (b) of FIG. 4 is a set composed only of view_id with a value of 3. The view ID set (MVC view_Id subset) in (c) of FIG. 4 is a set of view_id with a value of 4, 5, or 6. The MVC video sub-bitstream is composed of NAL units having a value of view_id included in each view ID set (MVC view_id subset).

It is to be noted that view_id is an identifier indicating a view in multiview video encoding. In the H.264 standard, a NAL unit header including MVC data is extended, and view_id is included in the MVC extension part of the NAL unit header.

Next, fields included in MVC extension descriptors are described. A field descriptor_tag is an identifier for identifying a descriptor, and a field MVC extension descriptor has 49 assigned thereto.

A field view_order_index_min indicates a minimum value for view_order_index of NAL units composing the MVC video sub-bitstream. A field view_order_index_max indicates a maximum value for view_order_index of NAL units composing the MVC video sub-bitstream.

In other words, views having values from view_order_index_min to view_order_index_max as values of view_order_index are included in the MVC video sub-bitstream. It is to be noted that view_order_index denotes values indicating the order of views, the values of view_id identifying views are associated using subset sequence parameter sets (subset SPSs) or the like.

A field no_prefix_nal_unit_present is a flag indicating whether or not the MVC video sub-bitstream includes a pre-fix NAL unit. When no_prefix_nal_unit_present has a value of 0, only the MVC video sub-bitstream including a base view includes the pre-fix NAL unit. Here, a base view is a view having a minimum value as the value of view_order_index.

Figure 5:
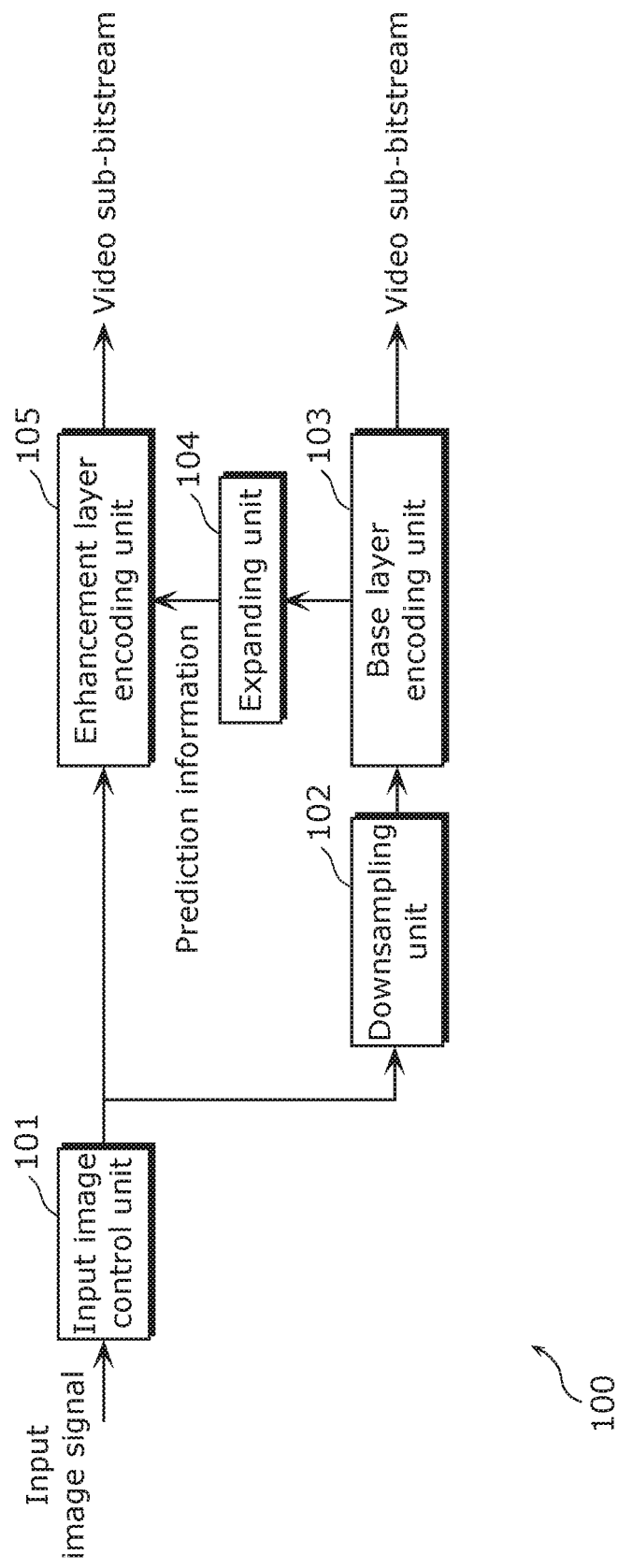
FIG. 5 is a block diagram illustrating a structure of a spatial scalable image encoding device according to a reference example.

FIG. 5 is a block diagram illustrating a structure of the spatial scalable image encoding device in a video encoding method in H. 264.

As shown in FIG. 5, the spatial scalable image encoding device 100 includes: an input image control unit 101; a downsampling unit 102; a base layer encoding unit 103; an enhancement layer encoding unit 105; and an expanding unit 104.

The input image control unit 101 transmits an input image signal to encoding units each in charge of encoding of one of layers. The downsampling unit 102 performs downsampling on the input image signal to generate an input image having a lower resolution. The base layer encoding unit 103 is a normal image encoding device which does not perform spatial scalable encoding, and performs image encoding on a base layer, and outputs a video sub-bitstream including coding information of the base layer.

The expanding unit 104 expands image coding information in the base layer to generate prediction information which is used in image encoding on an enhancement layer, and inputs the prediction information to the enhancement layer encoding unit 105. The enhancement layer encoding unit 105 performs image encoding on an input image signal (enhancement layer) which is input from the input image control unit 101 using the prediction information. The enhancement layer encoding unit 105 then outputs a video sub-bitstream including the coding information of the enhancement layer.

It is to be noted that the spatial scalable image encoding device 100 illustrated in FIG. 5 corresponds to, for example, two hierarchical layers that are a base layer and an enhancement layer. However, a plurality of enhancement layer encoding units are combined, which realizes spatial scalable image encoding on a plurality of enhancement layers.

Figure 6:
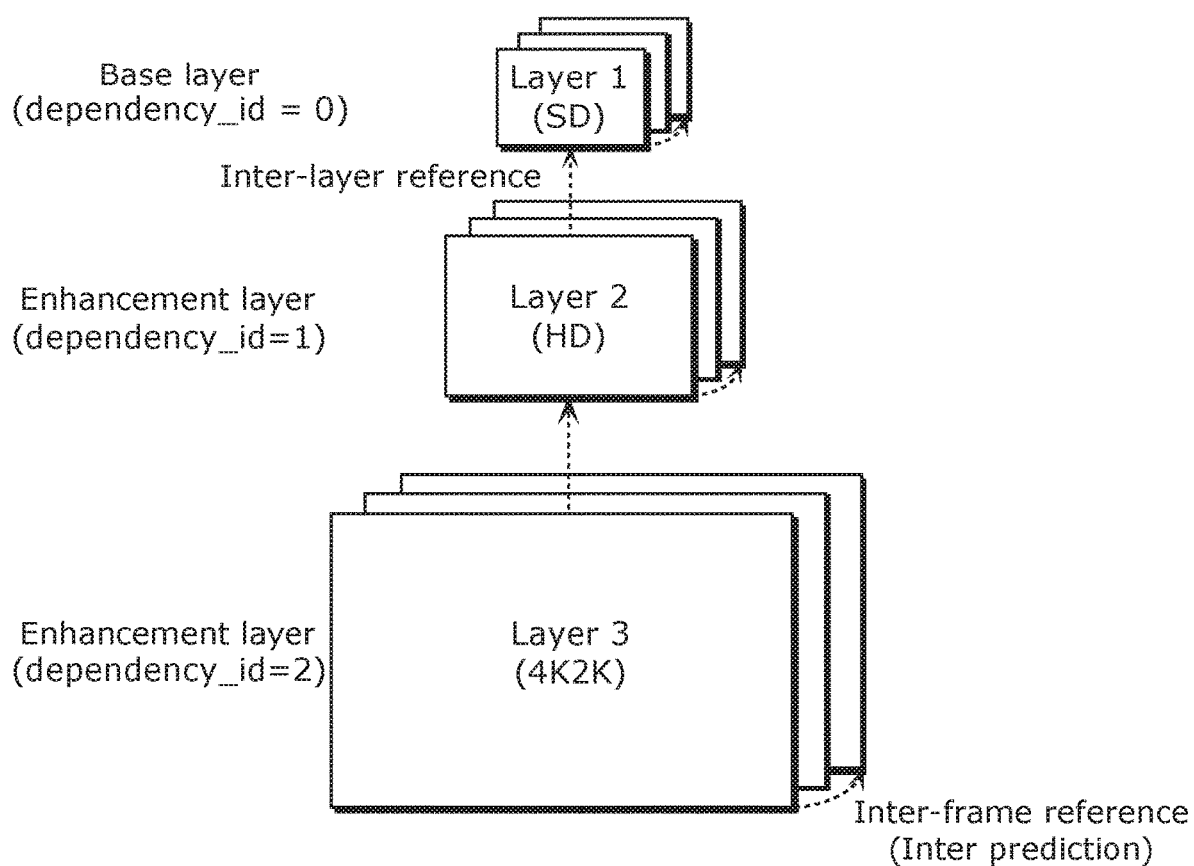
FIG. 6 is a diagram illustrating an image which is encoded by the spatial scalable image encoding device according to the reference example.

FIG. 6 illustrates an example of an input image in each encoding unit in one of layers in the spatial scalable image encoding device 100. In this example, the input image corresponds to one base layer and two enhancement layers.

The input image in the base layer (Layer1) has an SD size, and the input image in Layer2 that is a first enhancement layer has an HD size, and the input image in Layer3 that is a second enhancement layer has a 4k2k size. In addition, dependency_id of Layer1, Layer2, and Layer3, are 0, 1, and 2, respectively.

A layer having a relatively low resolution is called a lower layer, and a layer having a higher resolution is called a higher layer. In other words, the base layer is the lower layer as a bottom layer. In spatial scalable image encoding, inter-layer prediction is performed using prediction information of a lower layer at the time when a higher layer is encoded. In this way, encoding efficiency is increased. Information items used as prediction information include intra texture prediction, motion vector prediction, or inter-frame difference prediction. It is to be noted that use of prediction information of a lower layer at the time of encoding a higher layer is referred to as inter-layer reference (prediction).

The spatial scalable image encoding uses inter-frame prediction (inter prediction) in a temporal direction as in normal image encoding. However, all of the layers have an identical inter-frame reference relationship.

In FIG. 6, dotted-line arrows indicate inter-layer prediction and inter prediction. More specifically, each of images indicated by the arrows is referred to one of the images as starting points of the arrows. In the inter prediction in the base layer, a frame preceding by two frames is referred to. Likewise, also in the enhancement layer, a frame preceding by two frames is referred to. Here, whether or not to perform inter-layer prediction is switched on a per block basis.

Figure 7:
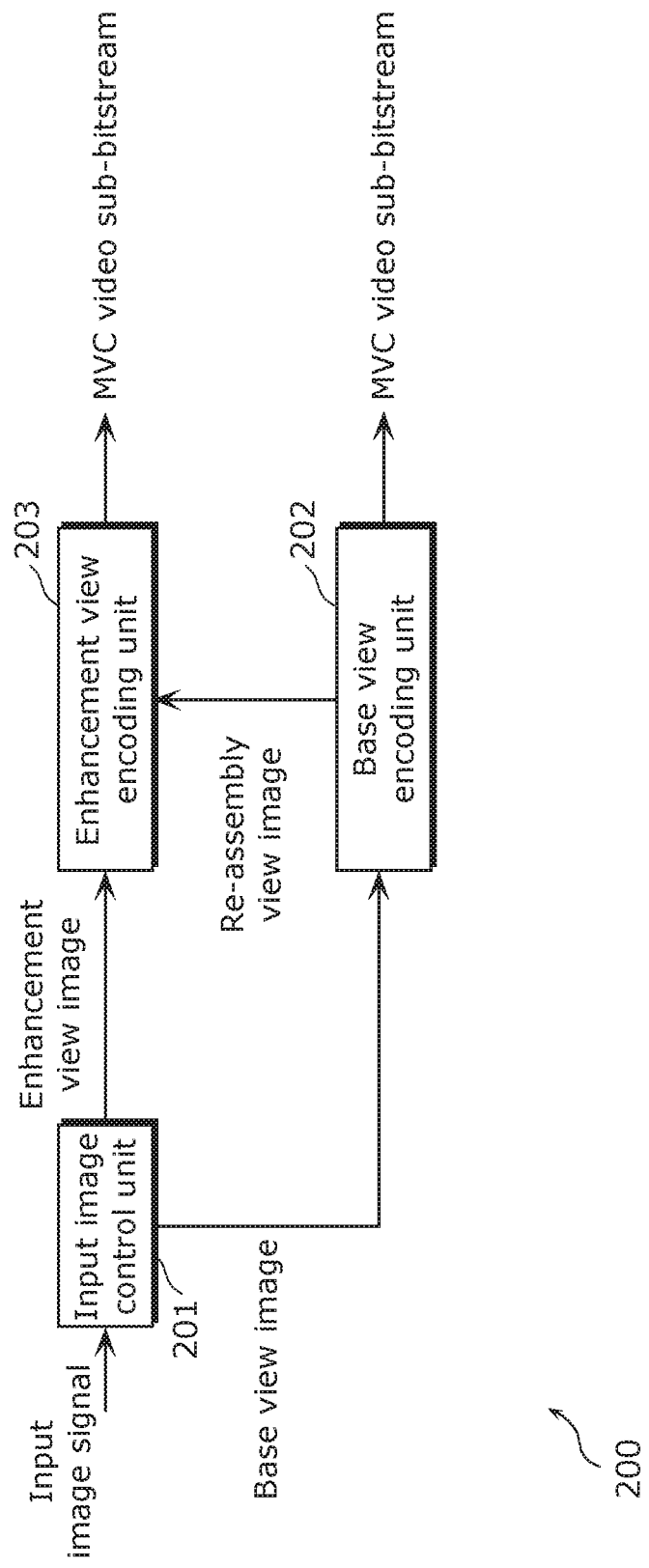
FIG. 7 is a block diagram illustrating a structure of a multiview image encoding device according to a reference example.

FIG. 7 is a block diagram illustrating a structure of the multiview image encoding device in a video encoding method in H.264.

As illustrated in FIG. 7, a multiview image encoding device 200 includes: an input image control unit 201; a base view encoding unit 202; and an enhancement view encoding unit 203.

The input image control unit 201 generates each view image from an input image signal as necessary, and transmits the view image to a corresponding one of the encoding units (202, 203). Here, the input image signal of each view may be input to the input image control unit 201.

The base view encoding unit 202 is a normal image encoding device which does not perform multiview encoding, performs image encoding on the base view, and outputs an MVC video sub-bitstream including coding information of the base view. In addition, the base view encoding unit 202 inputs, to the enhancement view encoding unit 203, a re-assembly view image of the base view encoded and decoded inside the base view encoding unit 202.

The enhancement view encoding unit 203 performs image encoding on the enhancement view image input from the input image control unit 201, using the re-assembly view image. The enhancement view encoding unit 203 then outputs an MVC video sub-bitstream including the coding information of the enhancement view. Here, the multiview image encoding device 200 illustrated in FIG. 7 corresponds to, for example, two views that are a base view and an enhancement view. However, a plurality of enhancement view encoding units are combined, which realizes multiview image encoding corresponding to a plurality of enhancement views.

Figure 8:
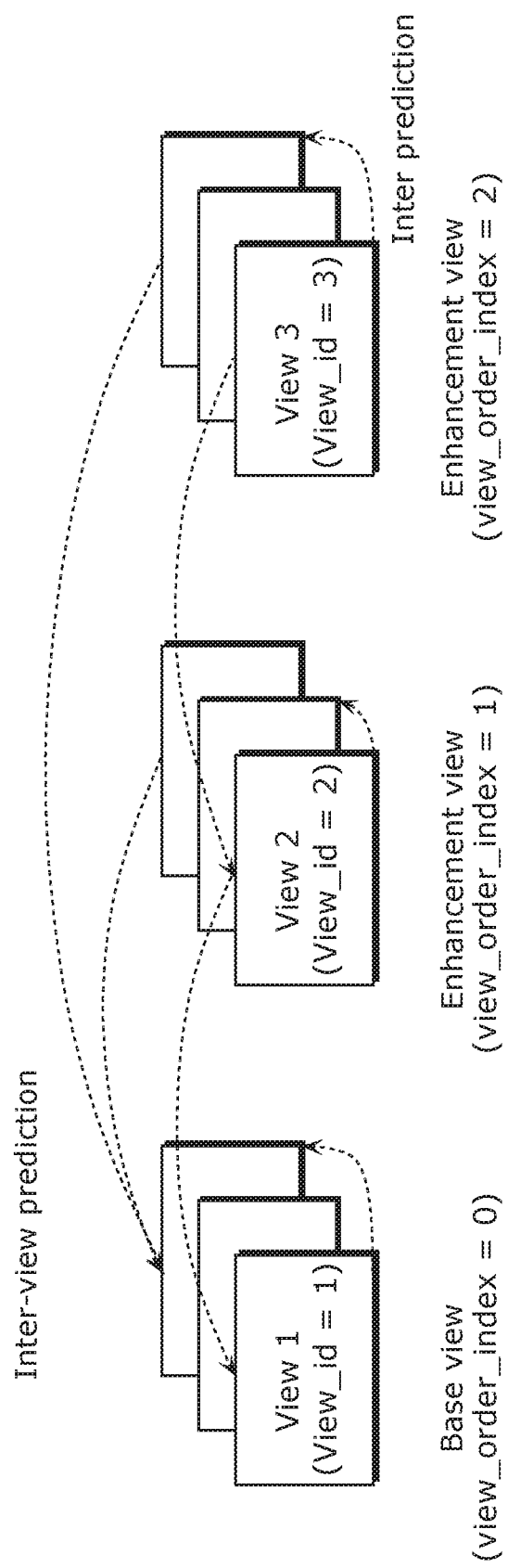
FIG. 8 is a diagram illustrating an image which is encoded by the multiview image encoding device according to the reference example.

FIG. 8 illustrates an example of an input image in each view in the multiview image encoding device 200. In this example, the input image corresponds to one base view and two enhancement views. The base view (View1) and the enhancement views (View2, View3) have an identical image resolution. In general, the view images are images captured at a same point of time from slightly different viewpoints, and thus have a correlation therebetween. Today, the multiview image encoding is used as a stereoscopic (3D) image encoding method.

Each of the views has an identifier for identifying the view assigned thereto. For example, View1, View2, and View3 have 1, 2, and 3, respectively, as values of view_id. In addition, for example, the views have 0, 1, and 2, respectively, as values of view_order_index.

In the multiview image encoding, inter-frame prediction is performed using, as a reference image, a re-assembly image of another view, at the time of encoding an enhancement view. In this way, encoding efficiency is increased. It is to be noted that use of a re-assembly image of another view at the time of encoding an enhancement view is referred to inter-view reference (prediction).

In the multiview image encoding, a re-assembly image of another view is used as a reference image in inter-frame prediction (inter prediction) in a temporal direction used in normal image encoding. However, no re-assembly image of another view that is temporally different from an encoding target image is used as a reference image.

When inter-view prediction is used, a reference view is selected. In FIG. 8, dotted-line arrows indicate inter-view prediction and inter prediction. In inter-view prediction of the first enhancement view (View2), the base view (View1) is referred to. On the other hand, in the inter-view prediction in the second enhancement view (View3), the first enhancement view (View2) is referred to. Here, whether or not to perform inter-view prediction is switched on a per block basis. In addition, when points of time are different, inter-view reference relationships may vary.

Figure 9:
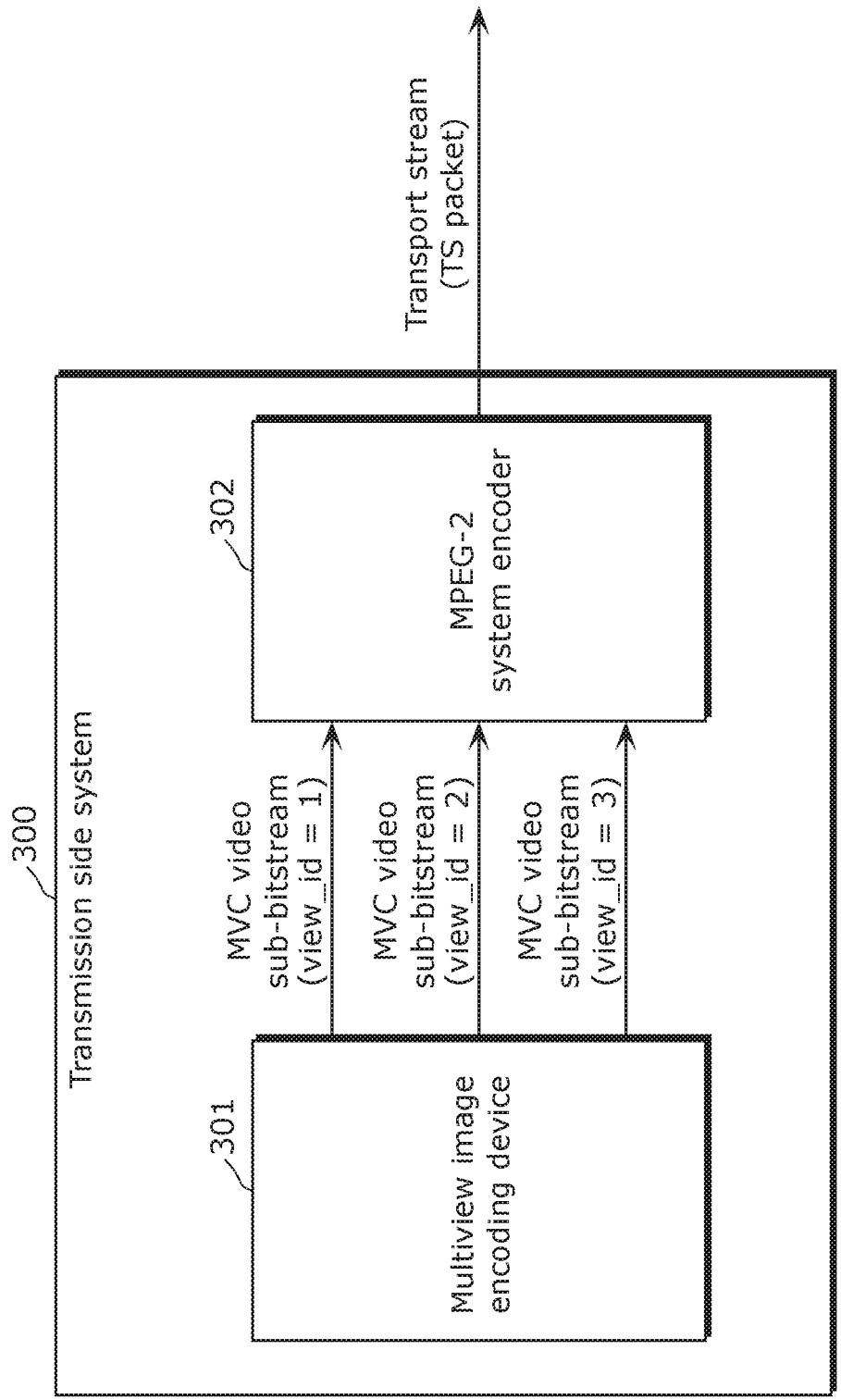
FIG. 9 is a block diagram illustrating a structure of a transmission side system according to a reference example.

FIG. 9 illustrates a transmission side system including the multiview image encoding device and the MPEG-2 system encoder. The multiview image encoding device 301 of the transmission side system 300 is equivalent in structure to the multiview image encoding device 200 illustrated in FIG. 7. However, in the multiview image encoding device 301 of the transmission side system 300, two enhancement view encoding units are combined.

The multiview image encoding device 301 encodes, as an input image, each view image as in FIG. 8, and outputs an MVC video sub-bitstream including coding information of each view to the MPEG-2 system encoder 302. In other words, three MVC video sub-bitstreams having 1, 2, and 3 as values of view_id are input to the MPEG-2 system encoder 302.

The MPEG-2 system encoder 302 classifies the input three MVC video sub-bitstreams into one group to generate a new MVC video sub-bitstream as necessary.

For example, the MPEG-2 system encoder 302 generates one MVC video sub-bitstream from two of the MVC video sub-bitstreams each having 1 or 2 as the value of view_id. In addition, the MPEG-2 system encoder 302 generates another MVC video sub-bitstream from the MVC video sub-bitstream having 3 as the value of view_id. The resulting two MVC video sub-bitstreams correspond to MVC video sub-bitstreams of (a) and (b) in FIG. 4.

As described above, the MPEG-2 system encoder 302 has a function for multiplexing input video and audio bitstreams. When a transport stream is used as a multiplexing format by the MPEG-2 system encoder 302, TS packets are output.

As described above, the MPEG-2 system encoder 302 classifies the input sub-bitstreams into one group to generate a new sub-bitstream as necessary.

However, the MPEG-2 system encoder 302 cannot generate a sub-bitstream including a plurality of dependency_id fields. In other words, the sub-bitstream generated by the MPEG-2 system encoder 302 has a low flexibility.

In addition, in the case of performing encoding involving a combination of spatial scalable image encoding and multiview image encoding, the sub-bitstreams that are input from the multiview image encoding device 301 to the MPEG-2 system encoder 302 are associated with both view_id (view_order_index) and dependency_id.

However, the MPEG-2 system encoder 302 cannot generate sub-bitstreams including view_id (view_order_index) and dependency_id in a mixed manner. For this reason, the resulting sub-bitstreams are limited.

In view of this, an image encoding method according to an aspect of the present invention includes: generating, from a plurality of first sub-bitstreams which are obtained by encoding a plurality of images on a per layer basis according to spatial scalable image encoding, a second sub-bitstream including two or more first sub-bitstreams corresponding to two or more layers, the two or more first sub-bitstreams being included in the plurality of first sub-bitstreams; and generating a descriptor including a first field indicating a minimum value for two or more layer identifiers indicating the two or more layers and a second field indicating a maximum value for the two or more layer identifiers.

In this way, the image encoding method makes it possible to generate the highly flexible sub-bitstreams corresponding to the plurality of layers.

For example, the generating of a second sub-bitstream may include generating a second sub-bitstream including the two or more first sub-bitstreams corresponding to the two or more layers and two or more views, from the plurality of first sub-bitstreams which are obtained by encoding the plurality of images on a per layer basis and on a per view basis according to the spatial scalable image encoding and multiview image encoding, and the generating of a descriptor may include generating a descriptor including the first field, the second field, a third field indicating a minimum value for two or more view identifiers indicating the two or more views, and a fourth field indicating a maximum value for the two or more view identifiers.

In this way, the image encoding method makes it possible to generate the highly flexible sub-bitstreams corresponding to the plurality of layers and the plurality of views.

In addition, for example, an image decoding method according to an aspect of the present invention includes: obtaining, from a bitstream including a plurality of first sub-bitstreams which are obtained by encoding a plurality of images on a per layer basis according to spatial scalable image encoding, (i) a second sub-bitstream including two or more first sub-bitstreams corresponding to two or more layers, and (ii) a descriptor of the second sub-bitstream, the two or more first sub-bitstreams being included in the plurality of first sub-bitstreams; parsing a descriptor including a first field indicating a minimum value for two or more layer identifiers indicating the two or more layers and a second field indicating a maximum value for the two or more layer identifiers; and determining a process to be performed on the second sub-bitstream corresponding to the descriptor, based on the minimum value indicated by the first field and the maximum value indicated by the second field.

In this way, the image encoding method makes it possible to process the highly flexible sub-bitstreams corresponding to the plurality of layers.

In addition, for example, the obtaining may include obtaining, from the bitstream including the plurality of first sub-bitstreams which are obtained by encoding the plurality of images on a per layer basis and on a per view basis according to the spatial scalable image encoding and multiview encoding, (i) the second sub-bitstream including the two or more first sub-bitstreams corresponding to the two or more layers and two or more views, and (ii) the descriptor of the second sub-bitstream, the parsing may include parsing of a descriptor including the first field, the second field, a third field indicating a minimum value for two or more view identifiers indicating the two or more views, and a fourth field indicating a maximum value for the two or more view identifiers, and the determining may include determining a process to be performed on the second sub-bitstream corresponding to the descriptor, based on the minimum value indicated by the first field, the maximum value indicated by the second field, the minimum value indicated by the third field, and the maximum value indicated by the fourth field.

In this way, the image encoding method makes it possible to process the highly flexible sub-bitstreams corresponding to the plurality of layers and the plurality of views.

These general and specific aspects may be implemented using a system, a device, an integrated circuit, a computer program, or a non-transitory computer-readable recording medium such as a CD-ROM, or any combination of systems, devices, integrated circuits, computer programs, or computer-readable recording media.

Hereinafter, certain embodiments are described in detail with reference to the Drawings. Each of the embodiments described below illustrates a general or specific example. The numerical values, shapes, materials, elements, the arrangement and connection of the elements, steps, the processing order of the steps etc. shown in the following embodiments are mere examples, and therefore do not limit the scope of the present invention. In addition, among the elements in the following exemplary embodiments, elements not recited in any one of the independent claims which define the most generic concept are described as arbitrary elements.

Embodiment 1

Figure 10:
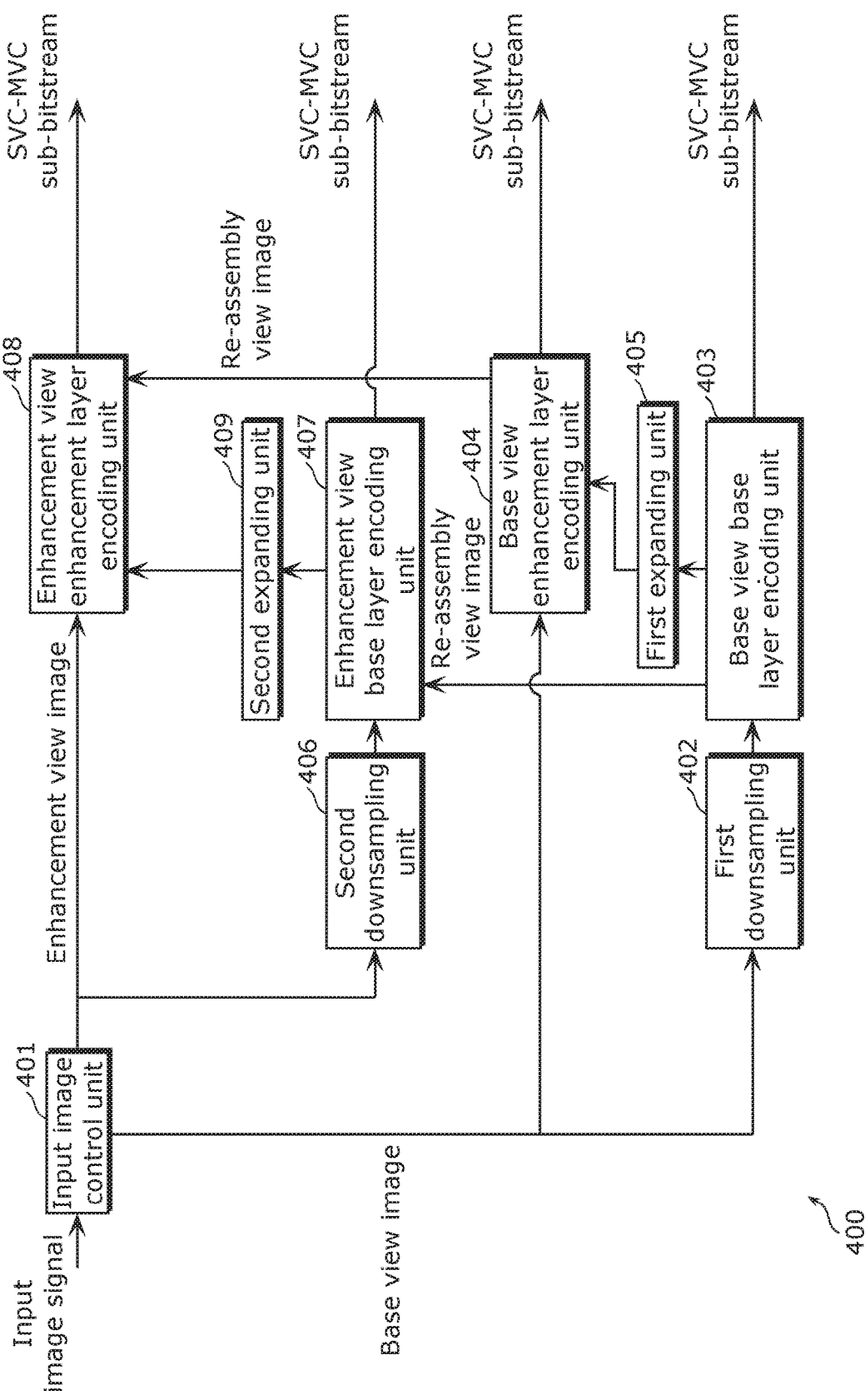
FIG. 10 is a block diagram illustrating a structure of a spatial scalable multiview encoding device according to Embodiment 1.

FIG. 10 is a block diagram illustrating a structure of a spatial scalable multiview video encoding device according to this embodiment. The spatial scalable multiview video encoding device 400 illustrated in FIG. 10 is an example of an image encoding device.

As illustrated in FIG. 10, the spatial scalable multiview video encoding device 400 includes: an input image control unit 401; a first downsampling unit 402; a base view base layer encoding unit 403; a base view enhancement layer encoding unit 404; a first expanding unit 405; a second downsampling unit 406; an enhancement view base layer encoding unit 407; an enhancement view enhancement layer encoding unit 408; and a second expanding unit 409.

Here, the first downsampling unit 402 and the second downsampling unit 406 have the same functions, and may be mounted to be shared. In addition, the first expanding unit 405 and the second expanding unit 409 have the same functions, and may be mounted to be shared.

In addition, the spatial scalable multiview video encoding device 400 illustrated in FIG. 10 corresponds to, for example, two views that are a base view and an enhancement view. When a plurality of enhancement view encoding units (a plurality of enhancement view base layer encoding units and a plurality of enhancement view enhancement layer encoding units etc.) are combined, it is possible to perform multiview image encoding corresponding to the plurality of enhancement views.

Likewise, the spatial scalable multiview video encoding device 400 corresponds to two layers that are a base layer and an enhancement layer. When a plurality of enhancement layer encoding units (a plurality of base view enhancement view enhancement layer encoding units and a plurality of enhancement view enhancement layer encoding units etc.) are combined, it is possible to perform spatial scalable image encoding corresponding to the plurality of enhancement layers.

The input image control unit 401 separates the input signal on a per view basis, and transmits each view to a corresponding one of encoding units.

The first downsampling unit 402 (the second downsampling unit 406) performs downsampling on the input image signal to generate an input image having a lower resolution.

The base view base layer encoding unit 403 is a normal image encoding device which does not perform spatial scalable encoding, and performs image encoding on a base layer of a base view, and outputs an SVC-MVC sub-bitstream including coding information of the base layer. The base view base layer encoding unit 403 then inputs the re-assembly image of the base layer of the base view to the enhancement view base layer encoding unit 407.

The first expanding unit 405 generates prediction information which is used for image encoding of an enhancement layer by expanding image coding information of the base layer of the base view, and inputs the prediction information to the base view enhancement layer encoding unit 404.

The base view enhancement layer encoding unit 404 performs image encoding on an input image signal (the enhancement layer of the base view) which is input from the input image control unit 401 using the prediction information. The base view enhancement layer encoding unit 404 next outputs an SVC-MVC sub-bitstream including coding information of the enhancement layer of the base view. Furthermore, the base view enhancement layer encoding unit 404 inputs a re-assembly image of the enhancement layer of the base view to the enhancement view enhancement layer encoding unit 408.

The enhancement view base layer encoding unit 407 performs image encoding of the base layer of the enhancement view, using the re-assembly image of the base layer of the base view re-assembled by the base view base layer encoding unit 403. The enhancement view base layer encoding unit 407 next outputs an SVC-MVC sub-bitstream including coding information of the base layer of the enhancement view.

The second expanding unit 409 generates prediction information which is used for image encoding of an enhancement layer of the enhancement view by expanding image coding information of the base layer of the enhancement view, and inputs the prediction information to the enhancement view enhancement layer encoding unit 408.

The enhancement view enhancement layer encoding unit 408 performs image encoding of an input image signal (the enhancement layer of the enhancement view) which is input from the input image control unit 401, using the forwarded prediction information (either the re-assembly image of the enhancement layer of the base view, or an image obtained by expanding the image coding information of the base layer of the enhancement view). The enhancement view enhancement layer encoding unit 408 next outputs an SVC-MVC sub-bitstream including coding information of the enhancement view enhancement layer.

The output SVC-MVC sub-bitstream is input to the MPEG-2 system encoder. The MPEG-2 system encoder has a function for multiplexing video and audio bitstreams.

Figure 11:
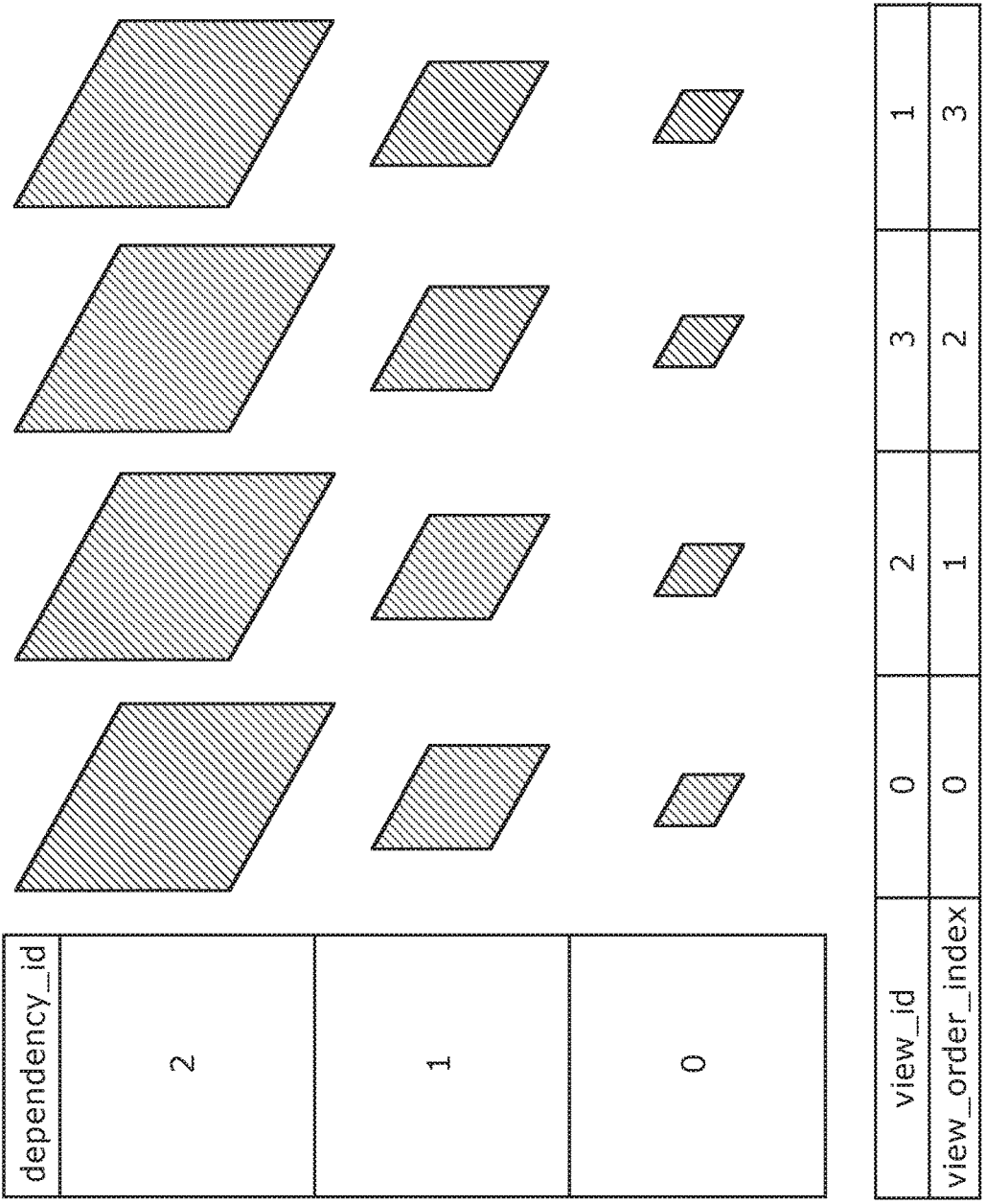
FIG. 11 is a diagram illustrating examples of sub-bitstreams to be input to a system encoder according to Embodiment 1.

FIG. 11 illustrates an example of an SVC-MVC sub-bitstream that is input to the MPEG-2 system encoder. Here, for the purpose of illustration, the spatial scalable multiview video encoding device 400 illustrated in FIG. 10 corresponds to two views that are a base view and an enhancement view, and corresponds to two hierarchical layers that are a base layer and an enhancement layer. In this case, four SVC-MVC sub-bitstreams are output to the MPEG-2 system encoder.

In FIG. 11, four views for a multiview and three hierarchical layers for spatial scalability are conceived. In this case, twelve SVC-MVC sub-bitstreams are present. Each of the SVC-MVC sub-bitstreams is identified by view_id (view_order_index) and dependency_id.

Each of the SVC-MVC sub-bitstreams illustrated in FIG. 11 is assigned with a value ranging from 0 to 3 as a value of view_id and a value ranging from 0 to 2 as a value of dependency_id. For example, 0 is assigned to the view_id of the SVC-MVC sub-bitstream at the upper left, and 2 is assigned to the dependency_id thereof.

Here, the values of view_id and dependency_id may be directly inserted to, for example, a NAL unit header. In addition, based on a layer ID inserted to the NAL unit header, the view_id and dependency_id corresponding to the layer ID may be obtained from higher layer information such as a sequence parameter set (SPS).

Figure 12:
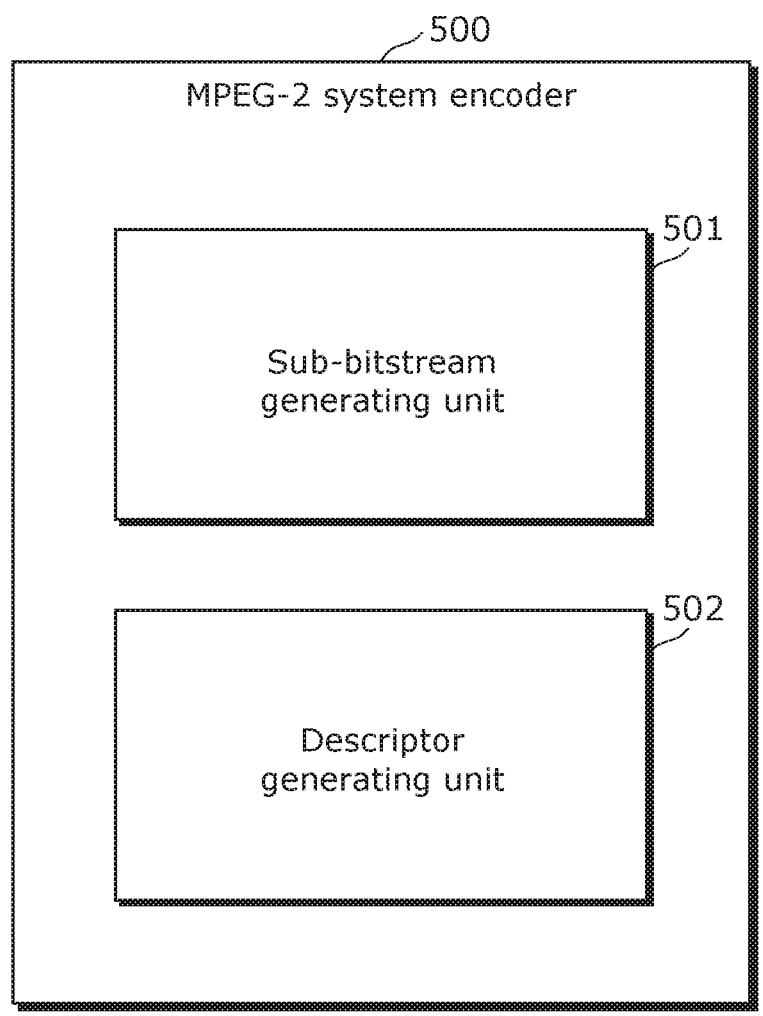
FIG. 12 is a block diagram illustrating a structure of the system encoder according to Embodiment 1.

FIG. 12 is a block diagram illustrating a structure of an MPEG-2 system encoder. The MPEG-2 system encoder 500 illustrated in FIG. 12 is an example of an image encoding device. The MPEG-2 system encoder 500 includes a sub-bitstream generating unit 501 and a descriptor generating unit 502. Here, the MPEG-2 system encoder 500 may further include a TS packet generating unit etc.

The sub-bitstream generating unit 501 classifies a plurality of input SVC-MVC sub-bitstreams (first sub-bitstreams) into groups to generate new SVC-MVC sub-bitstreams (second sub-bitstreams) as necessary, and outputs the new ones.

Figure 13:
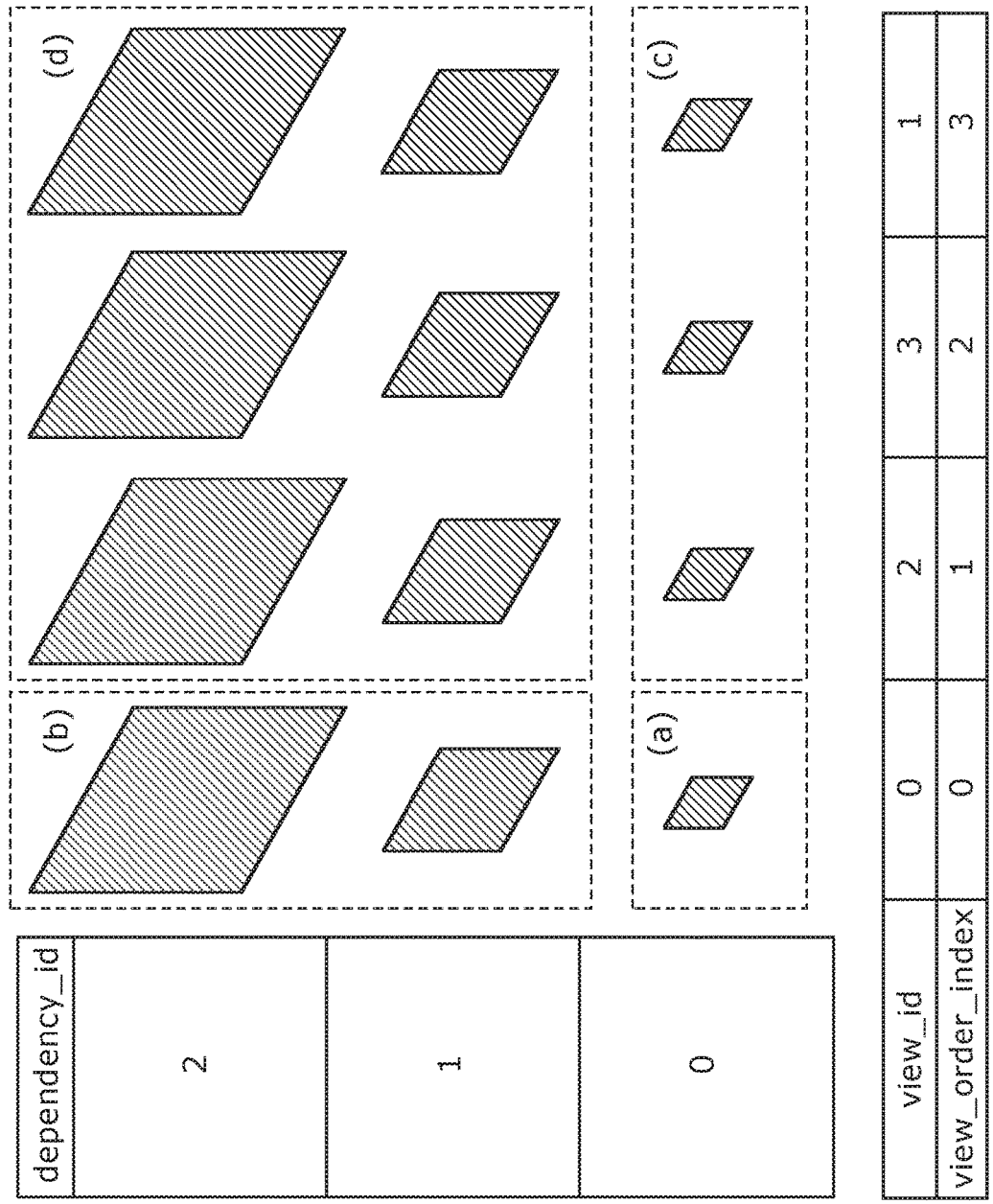
FIG. 13 is a diagram illustrating sub-bitstreams which are generated by a sub-bitstream generating unit according to Embodiment 1.

FIG. 13 illustrates an SVC-MVC sub-bitstream that is generated by the sub-bitstream generating unit 501 when the twelve SVC-MVC sub-bitstreams illustrated in FIG. 11 are input. The SVC-MVC sub-bitstreams are classified into groups as enclosed by dotted lines. Next, the four SVC-MVC sub-bitstreams (a) to (d) in FIG. 13 are output from the sub-bitstream generating unit 501.

For example, in (d) of FIG. 13, higher layers in the enhancement view that is conceived to be rarely used is classified into a group of SVC-MVC sub-bitstreams. Classifying some of the SVC-MVC sub-bitstreams into a group facilitates management of the sub-bitstreams in a system layer.

Here, (a) to (d) of FIG. 13 illustrates examples of classification, and classification is not limited thereto. The number of SVC-MVC sub-bitstreams which are output by the sub-bitstream generating unit 501 is not limited. In addition, one of input SVC-MVC sub-bitstreams may belong to a plurality of groups of SVC-MVC sub-bitstreams to be output (in other words, some of the areas enclosed by dotted lines may be overlapped with each other).

The descriptor generating unit 502 generates a descriptor that is used in the MPEG-2 system. The descriptor generating unit 502 generates a descriptor corresponding to encoding as a combination of spatial scalable image encoding and multiview image encoding (the descriptor is hereinafter referred to as an SVC-MVC extension descriptor).

FIG. 14 illustrates examples of SVC-MVC extension descriptors. The SVC-MVC extension descriptors are information related to SVC-MVC sub-bitstreams, and include information of dependency_id and view_id (view_order_index). Next, each of fields included in the SVC-MVC extension descriptors is described. As for the same fields as in the fields included in the SVC extension descriptors in FIG. 1 or the MVC extension descriptors in FIG. 3, the descriptions thereof are as provided above.

A field as descriptor_tag is an identifier for identifying a descriptor, and an SVC-MVC extension descriptor has a particular value (for example, a value selected from 50 to 63) assigned thereto.

A field as dependency_id_start indicates a minimum value of dependency_id of a NAL unit included in the SVC-MVC sub-bitstream thereof. A field as dependency_id_end indicates a maximum value of dependency_id of a NAL unit included in the SVC-MVC sub-bitstream thereof.

In other words, the NAL units having values from the dependency_id_start to the dependency_id_end as the values of the dependency_id are included in the SVC-MVC sub-bitstream thereof.

In addition, in the above description, dependency_id, quality_id, and view_id are included in the NAL unit headers or the extension parts of the NAL unit headers. However, this is a non-limiting example. For example, view_id, quality_id, and dependency_id corresponding to the layer ID may be obtained from higher layer information such as SPS, based on the layer ID inserted in the NAL unit headers.

Next, values of some of the fields included in the SVC-MVC extension descriptors are described in detail with reference to FIG. 13. The SVC-MVC sub-bitstream in (a) of FIG. 13 has SVC-MVC extension descriptors which are dependency_id_start with a value of 0, dependency_id_end with a value of 0, view_order_index_min with a value of 0, and view_order_index_max with a value of 0.

In addition, the SVC-MVC sub-bitstream in (b) of FIG. 13 has dependency_id_start with a value of 1, dependency_id_end with a value of 2, view_order_index_min with a value of 0, and view_order_index_max with a value of 0. In addition, the SVC-MVC sub-bitstream in (c) of FIG. 13 has dependency_id_start with a value of 0, dependency_id_end with a value of 0, view_order_index_min with a value of 1, and view_order_index_max with a value of 3.

In addition, the SVC-MVC sub-bitstream in (d) of FIG. 13 has dependency_id_start with a value of 1, dependency_id_end with a value of 2, view_order_index_min with a value of 1, and view_order_index_max with a value of 3.

In other words, when only a single value for dependency_id is included in the sub-bitstream, an identical value is set to dependency_id_start and dependency_id_end. Likewise, when only a single value for view_order_index is included in the sub-bitstream, an identical value is set to view_order_index_min and view_order_index_max.

With the use of the SVC-MVC extension descriptors in FIG. 14, the descriptor generating unit 502 can flexibly generate descriptors corresponding to various kinds of SVC-MVC sub-bitstreams which are output from the sub-bitstream generating unit 501.

As described above, in this embodiment, the sub-bitstream generating unit 501 generates sub-bitstreams having a plurality of items of dependency_id (layer identifiers). Next, the descriptor generating unit 502 generates descriptors including a field (first field) indicating a minimum value among the plurality of items of dependency_id and a field (second field) indicating a maximum number of the same. Accordingly, the image encoding device according to this embodiment can flexibly generate sub-bitstreams.

In addition, the sub-bitstream generating unit 501 may generate sub-bitstreams including a plurality of items of view_order_index (view identifiers). Next, the descriptor generating unit 502 may generate descriptors including a field (third field) indicating a minimum value among the plurality of items of view_order_index and a field (fourth field) indicating a maximum number of the same. In this way, the image encoding device can generate sub-bitstreams further flexibly.

For example, when encoding as a combination of spatial scalable image encoding and multiview image encoding is performed, the descriptor generating unit 502 uses SVC-MVC extension descriptors corresponding to these kinds of encoding. In this way, sub-bitstreams are flexibly generated.

Embodiment 2

Figure 15:
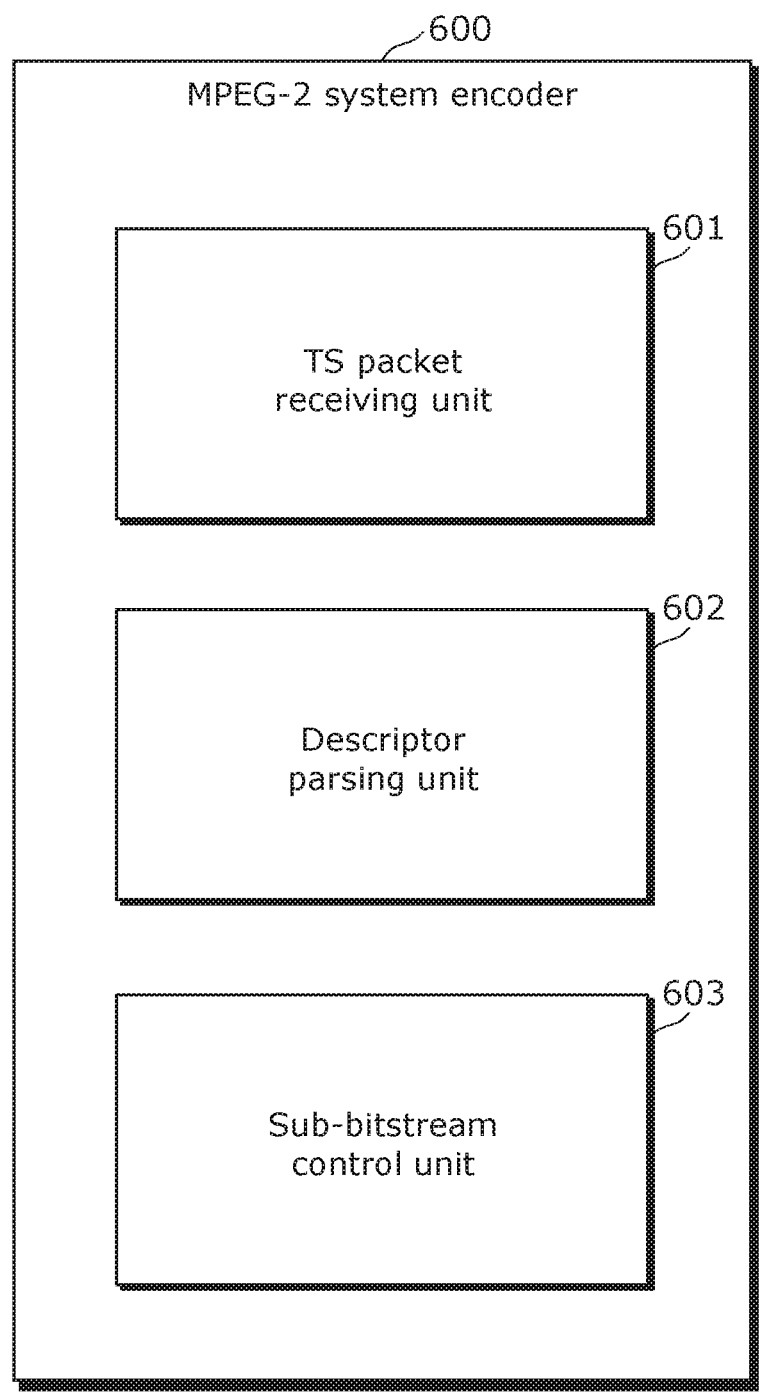
FIG. 15 is a block diagram illustrating a structure of a system decoder according to Embodiment 2.

FIG. 15 is a block diagram illustrating a structure of an MEPG-2 system decoder which receives TS packets including SVC-MVC sub-bitstreams in the payloads thereof. The MPEG-2 system decoder 600 illustrated in FIG. 15 is an example of an image decoding device. The MPEG-2 system decoder 600 includes: a TS packet receiving unit 601; a descriptor parsing unit 602; and a sub-bitstream control unit 603. It is to be noted that some conventional functional blocks such as a demultiplexing unit etc. are not shown.

The TS packet receiving unit 601 receives TS packets. The TS packet receiving unit 601 then parses TS packet headers and obtain payload data.

The descriptor parsing unit 602 parses descriptors extracted from the payloads of the TS packets. The descriptor parsing unit 602 according to this embodiment is capable of parsing SVC-MVC extension descriptors illustrated in FIG. 14.

The sub-bitstream control unit 603 performs control on corresponding sub-bitstreams based on the descriptor information output from the descriptor parsing unit 602.

Figure 16:
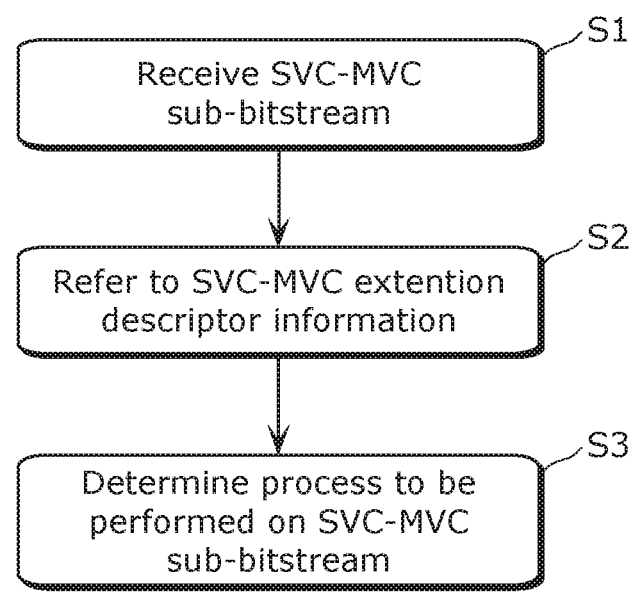
FIG. 16 is a block diagram illustrating a structure of the system decoder according to Embodiment 2.

FIG. 16 illustrates a flow of processes on an SVC-MVC sub-bitstream in the MPEG-2 system decoder 600. First, the TS packet receiving unit 601 receives the SVC-MVC sub-bitstream (Step S1). Next, the sub-bitstream control unit 603 refers to information of the SVC-MVC extension descriptor corresponding to the SVC-MVC sub-bitstream (Step S2). This information is output from the descriptor parsing unit 602.

The sub-bitstream control unit 603 recognizes a spatial layer including the SVC-MVC sub-bitstream, from the values of dependency_id_start and dependency_id_end of the SVC-MVC extension descriptor information. In addition, the sub-bitstream control unit 603 recognizes a view order included in the SVC-MVC sub-bitstream, from the values of view_order_index_min and view_order_index_max.

The sub-bitstream control unit 603 next judges (determines) a process to be performed on the SVC-MVC sub-bitstream, according to a predetermined standard that is set in a decoder side system (Step S3). For example, when a standard that no extension layer is decoded and displayed is set, the sub-bitstream control unit 603 discards an SVC-MVC sub-bitstream having 1 or larger as the value of dependency_id_start, instead of inputting the SVC-MVC sub-bitstream to a video decoder.

As described above, in this embodiment, the field indicating the minimum value and the field indicating the maximum value among the values of the plurality of items of dependency_id are used. Accordingly, efficient processing is possible. Furthermore, the descriptors may include a field indicating a minimum value and a maximum value among the values of a plurality of items of view_order_index. In this way, further efficient processing is possible.

In addition, the use of SVC-MVC extension descriptors corresponding to the spatial scalable image encoding and multiview image encoding facilitates management of sub-bitstreams in the system layer. For example, the MPEG-2 system decoder 600 discards one SVC-MVC sub-bitstream with reference to the SVC-MVC extension descriptor thereof, and can thereby reduce a load on the video decoder.

Each of the elements in each of the above-described embodiments may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory.

In other words, each of the image encoding device and the image decoding device includes control circuitry and storage electrically connected to the control circuitry (accessible from the control circuitry). The control circuitry includes at least one of exclusive hardware and a program executing unit. In addition, when the control circuitry includes the program executing unit, the storage stores a software program which is executed by the program executing unit.

Here, the software which realizes the image encoding device, the image decoding device, or the like in each of the embodiments is a program as described below.

The program causes a computer to execute an image encoding method including: generating, from a plurality of first sub-bitstreams which are obtained by encoding a plurality of images on a per layer basis according to spatial scalable image encoding, a second sub-bitstream including two or more first sub-bitstreams corresponding to two or more layers, the two or more first sub-bitstreams being included in the plurality of first sub-bitstreams; and generating a descriptor including a first field indicating a minimum value for two or more layer identifiers indicating the two or more layers and a second field indicating a maximum value for the two or more layer identifiers.

In addition, the program causes a computer to execute an image decoding method including: obtaining, from a bitstream including a plurality of first sub-bitstreams which are obtained by encoding a plurality of images on a per layer basis according to spatial scalable image encoding, (i) a second sub-bitstream including two or more first sub-bitstreams corresponding to two or more layers, and (ii) a descriptor of the second sub-bitstream, the two or more first sub-bitstreams being included in the plurality of first sub-bitstreams; parsing a descriptor including a first field indicating a minimum value for two or more layer identifiers indicating the two or more layers and a second field indicating a maximum value for the two or more layer identifiers; and determining a process to be performed on the second sub-bitstream corresponding to the descriptor, based on the minimum value indicated by the first field and the maximum value indicated by the second field.

The image encoding device and the image decoding device according to one or more aspects have been described above based on the embodiments. However, the present invention is not limited to these embodiments. Various modifications arrived at and made to the embodiments by those skilled in the art and embodiments configured by combining some elements of different embodiments may also be included in the scope of the one or more aspects, without materially departing from the scope of the present invention.

Embodiment 3

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 17:
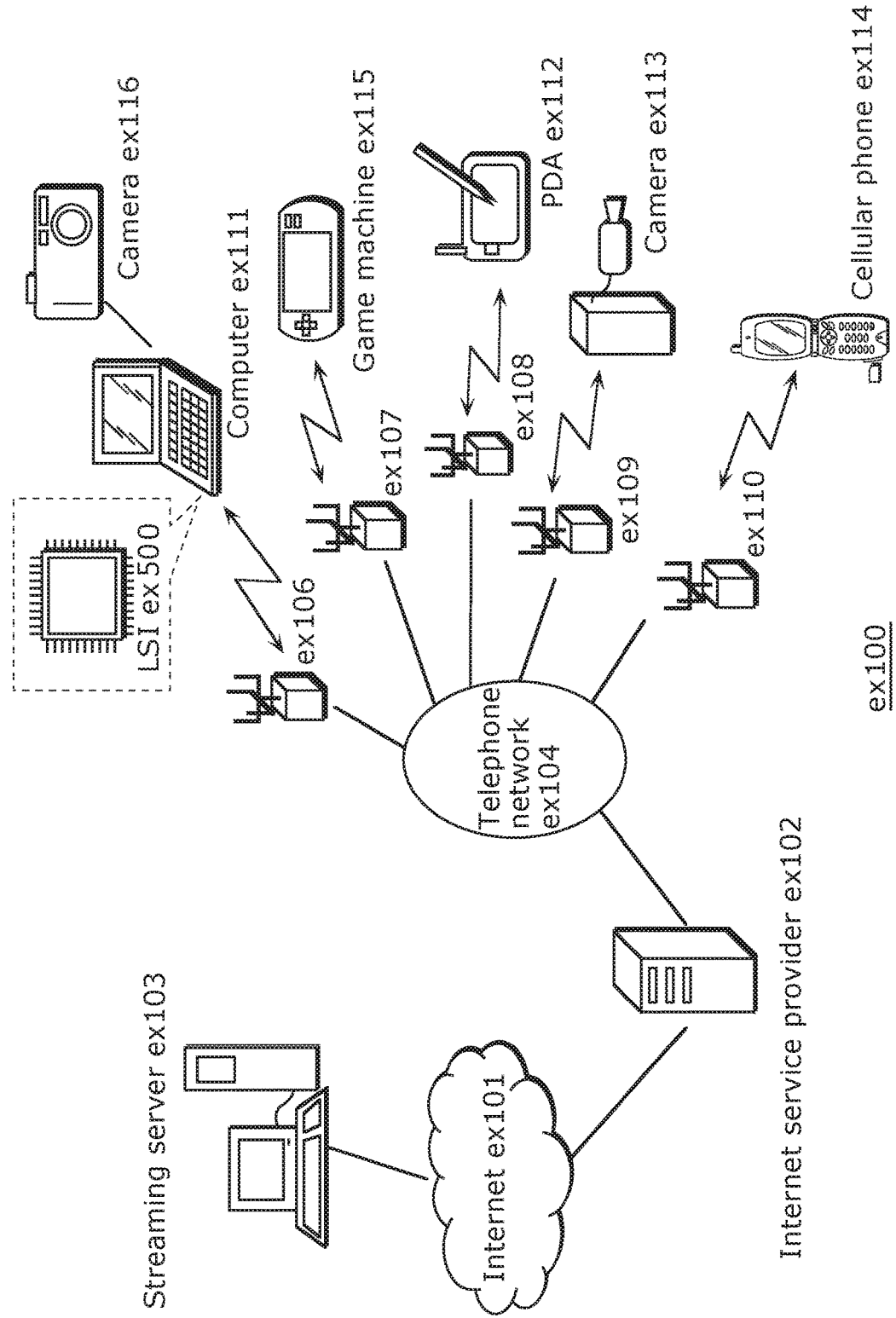
FIG. 17 shows an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present invention), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present invention).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
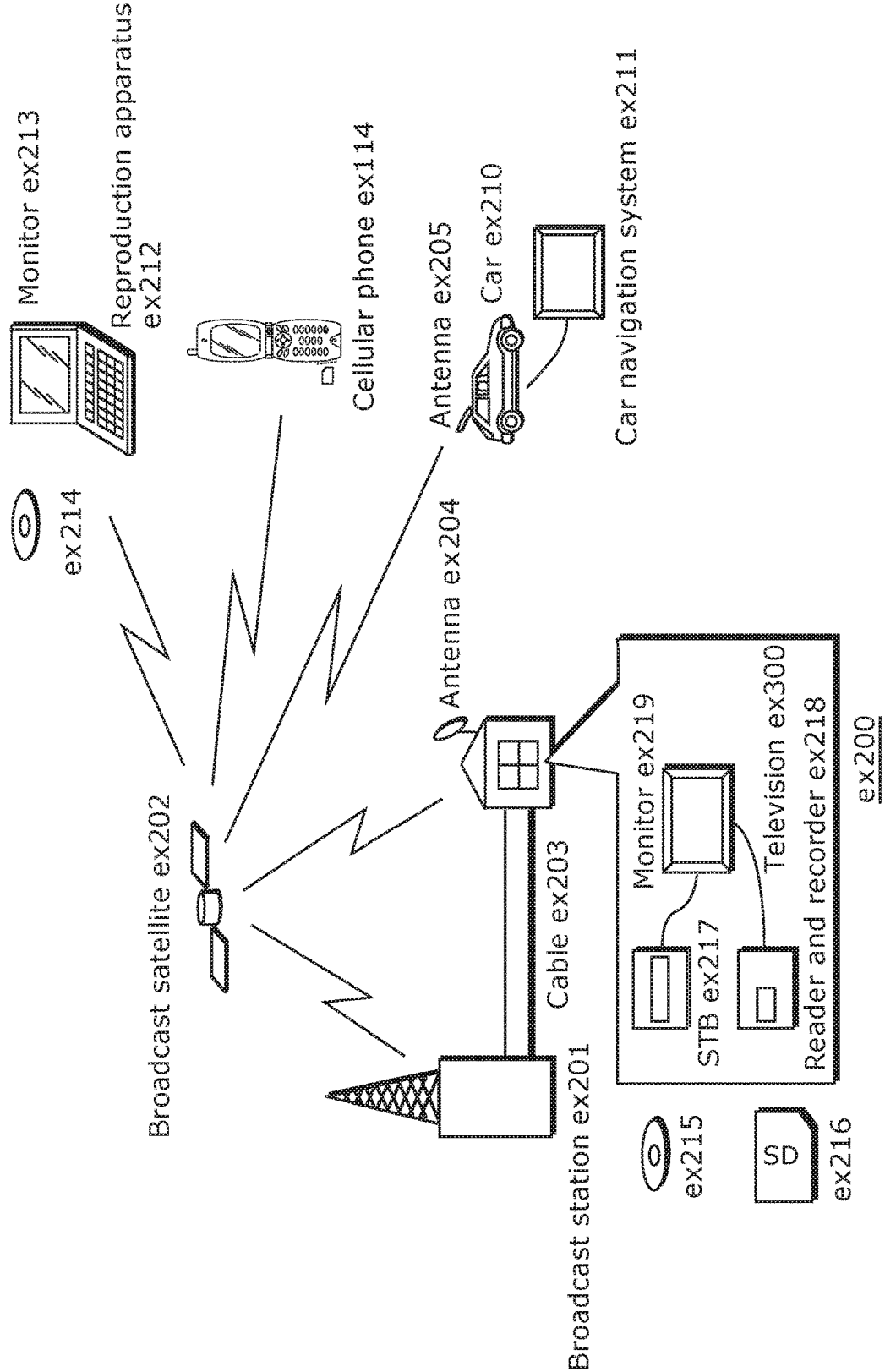
FIG. 18 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
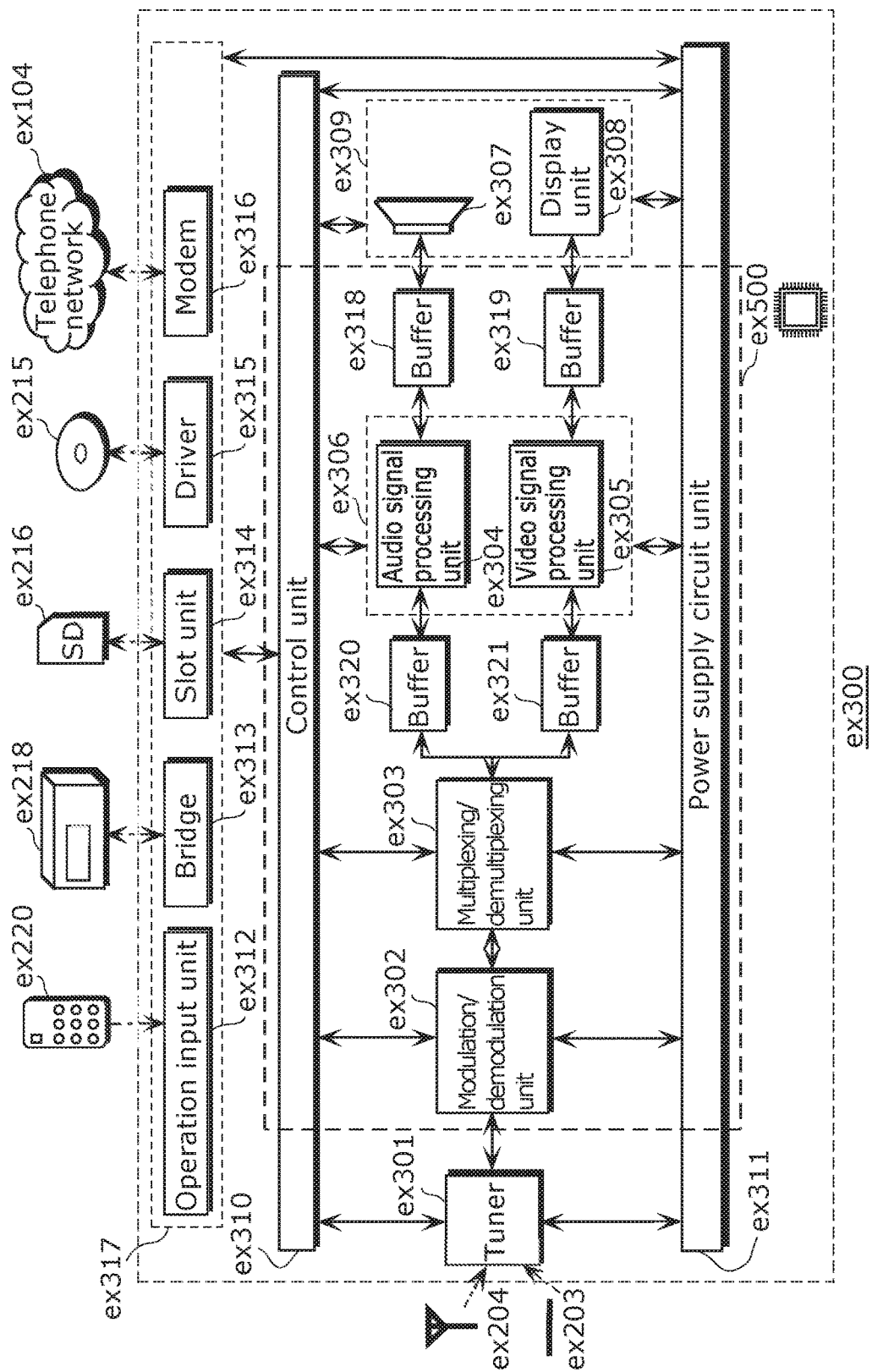
FIG. 19 shows a block diagram illustrating an example of a configuration of a television.

FIG. 19 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 20:
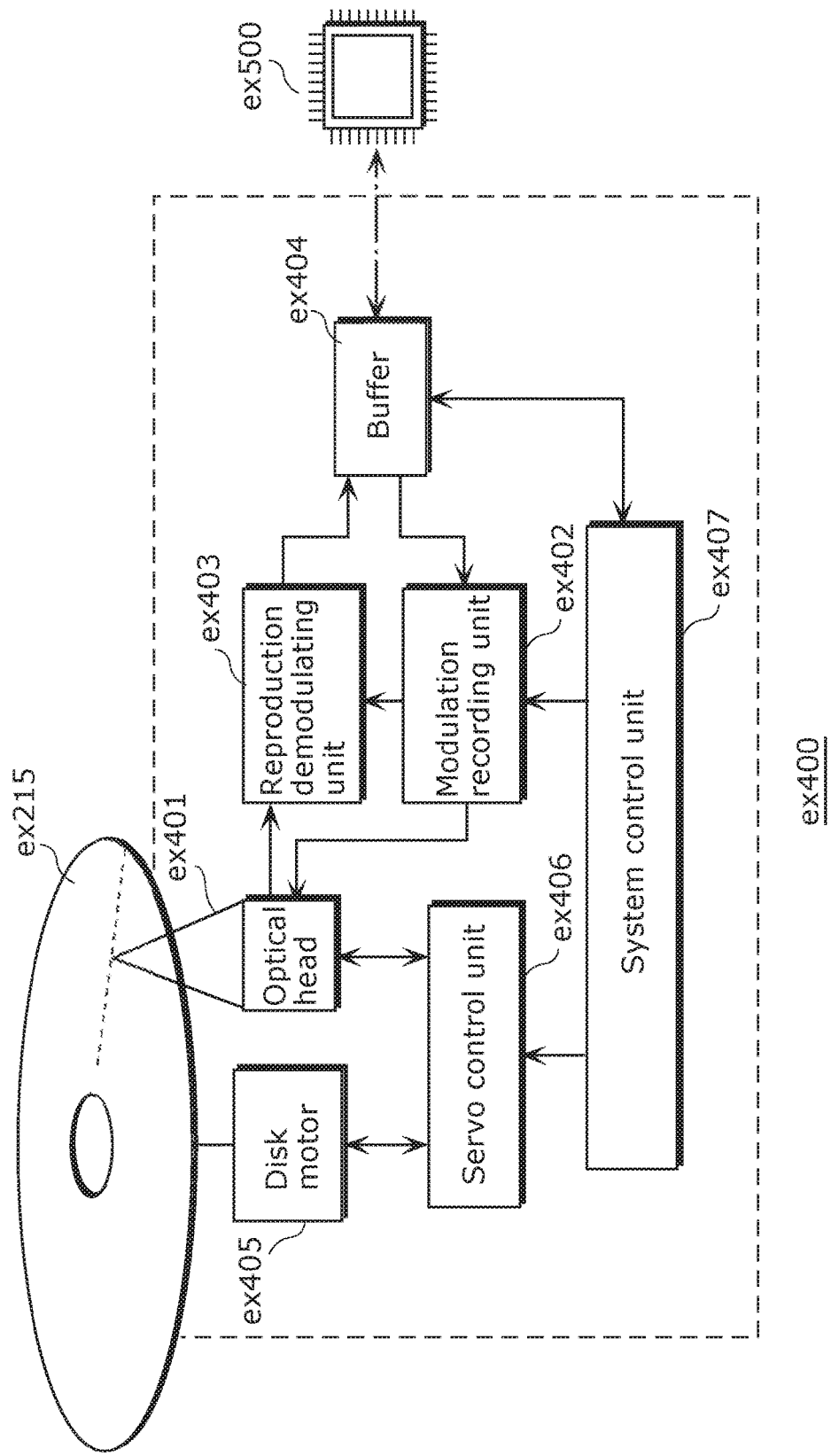
FIG. 20 shows a block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
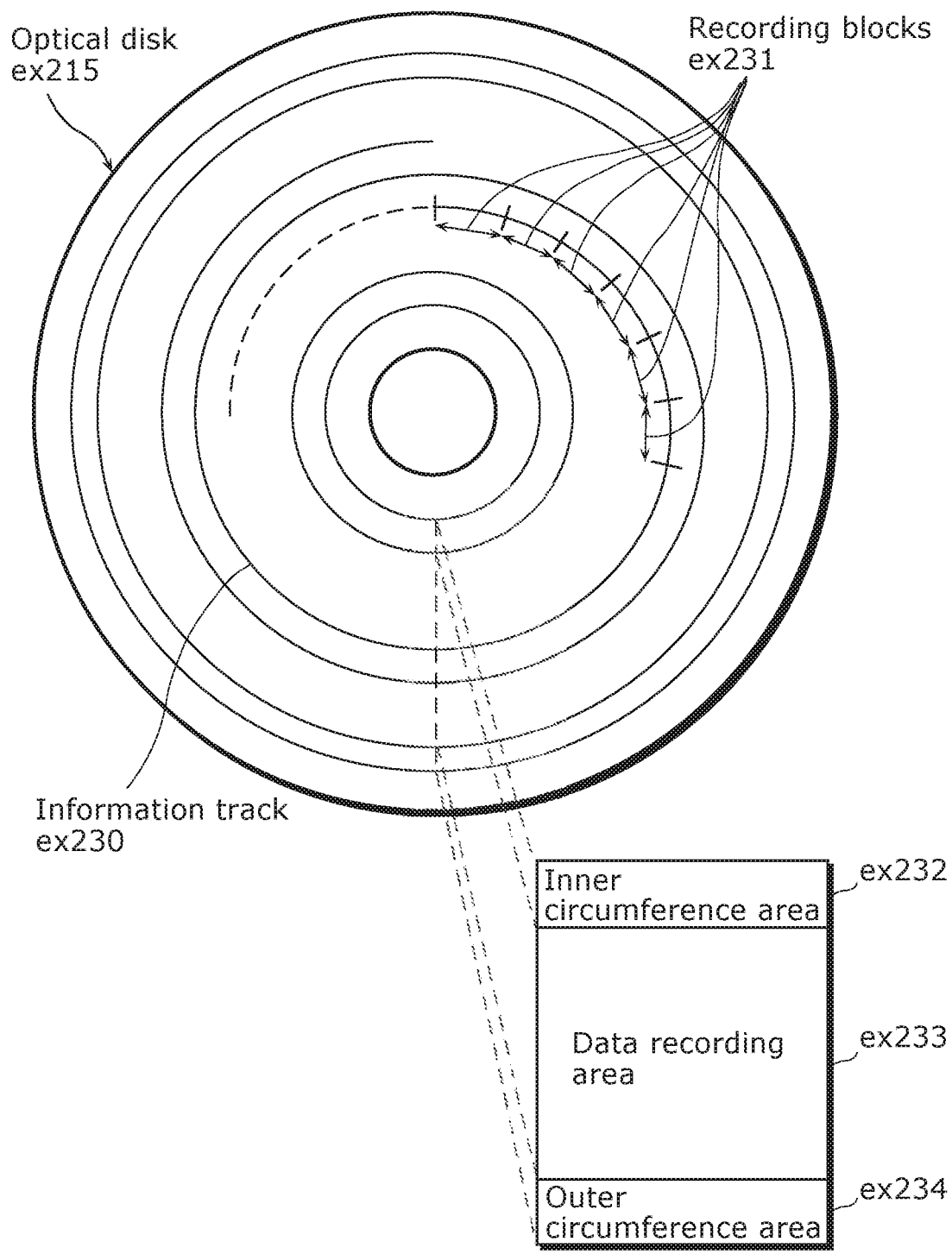
FIG. 21 shows an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
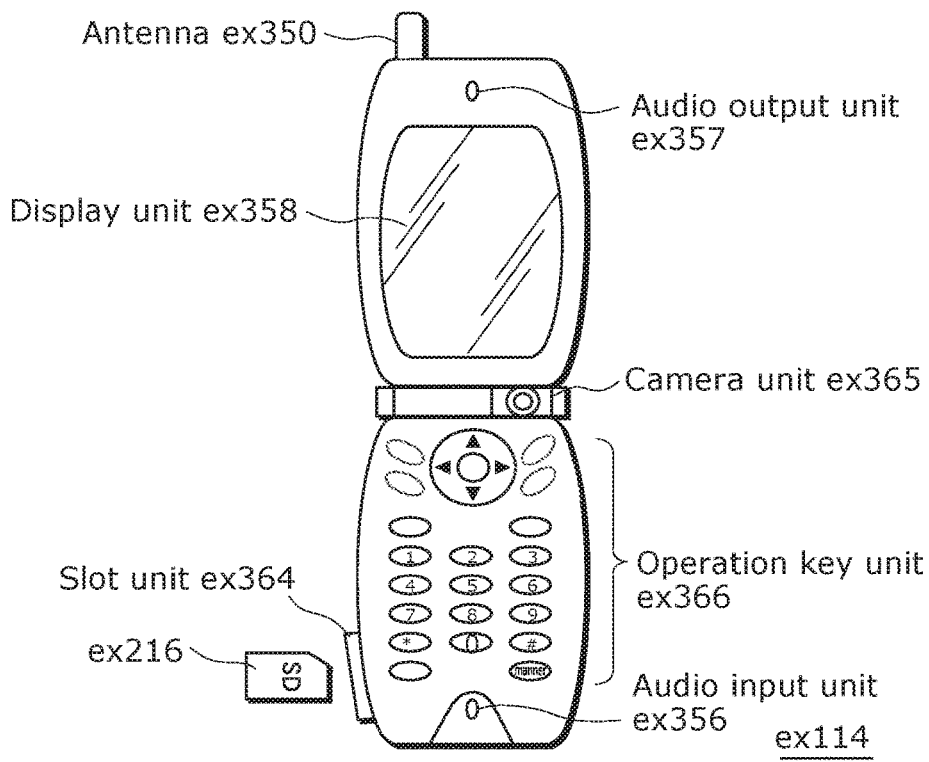
FIG. 22A shows an example of a cellular phone.

FIG. 22A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 22B:
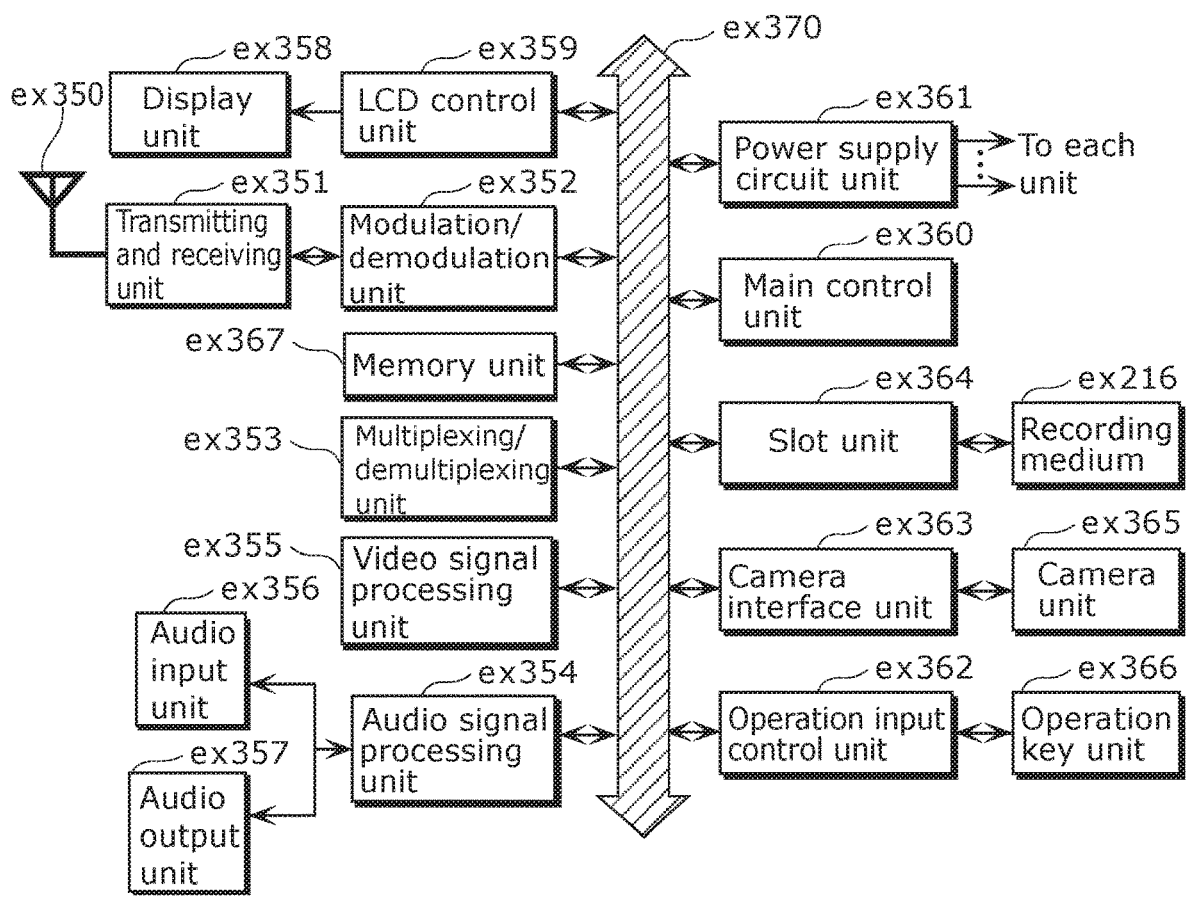
FIG. 22B is a block diagram showing an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present invention), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
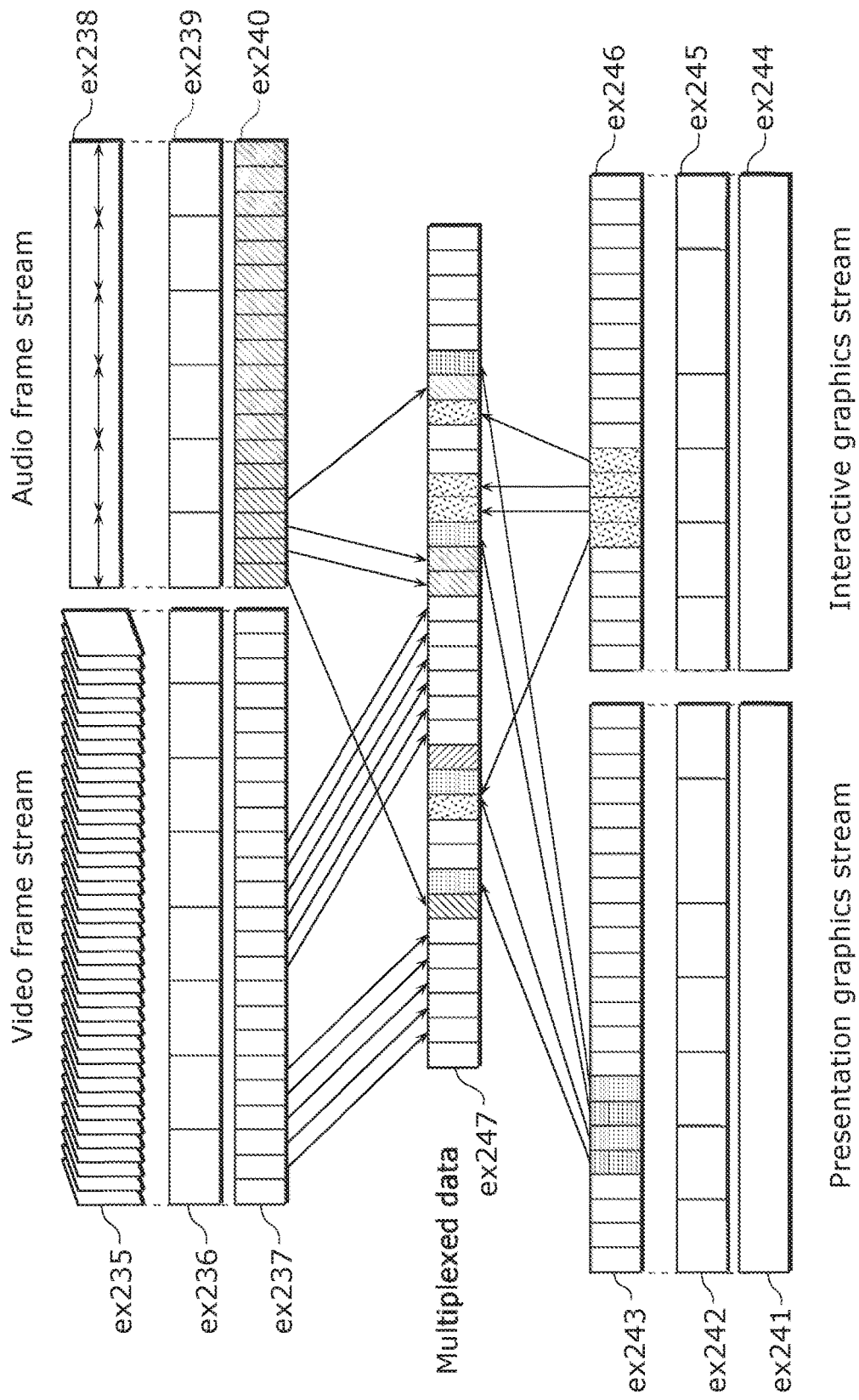
FIG. 24 schematically shows how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
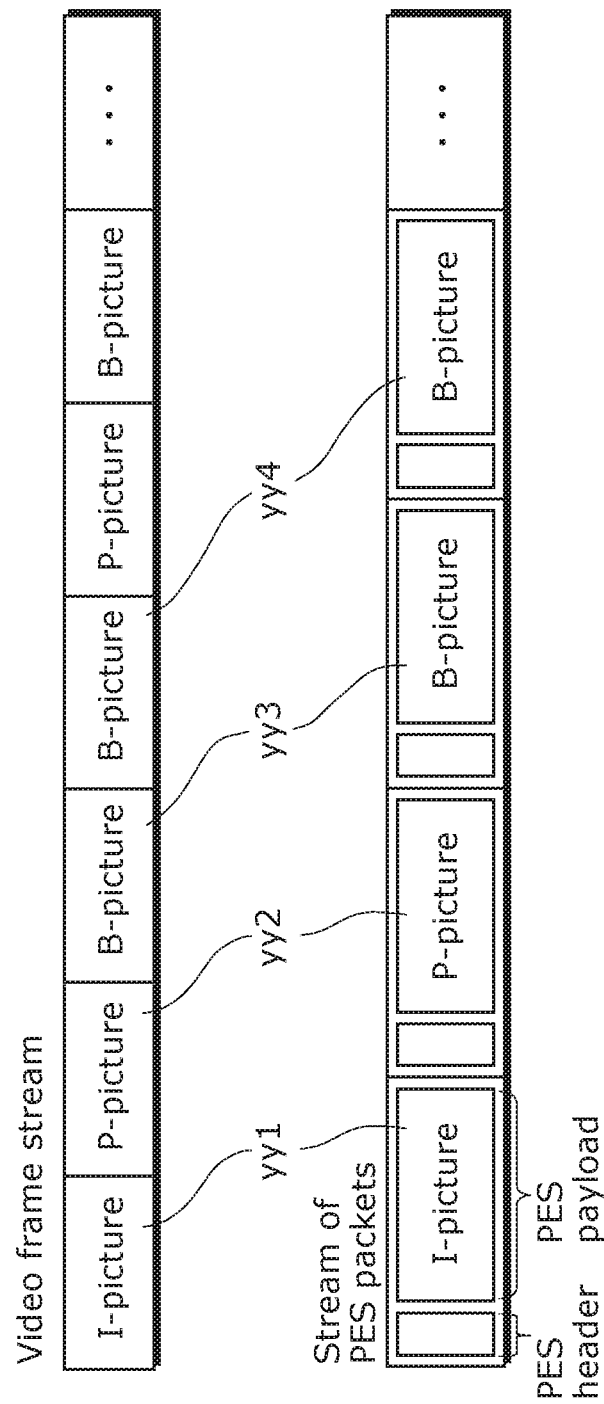
FIG. 25 shows how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
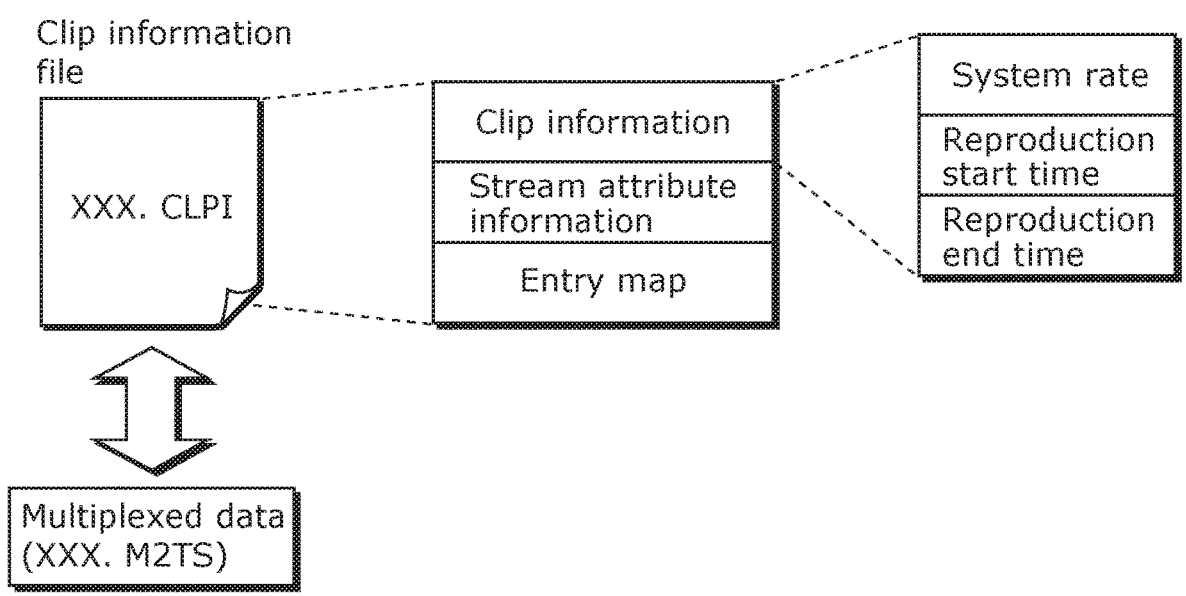
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
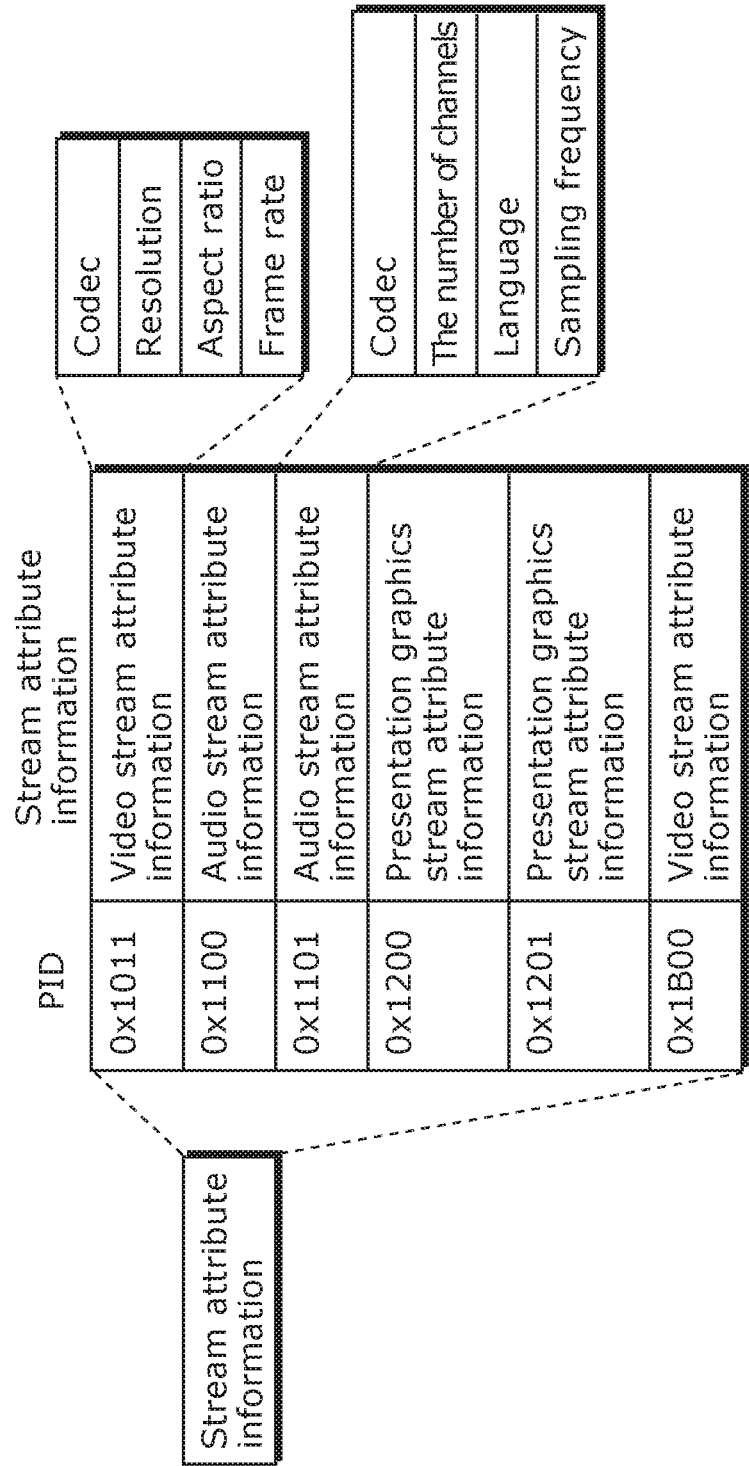
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 30:
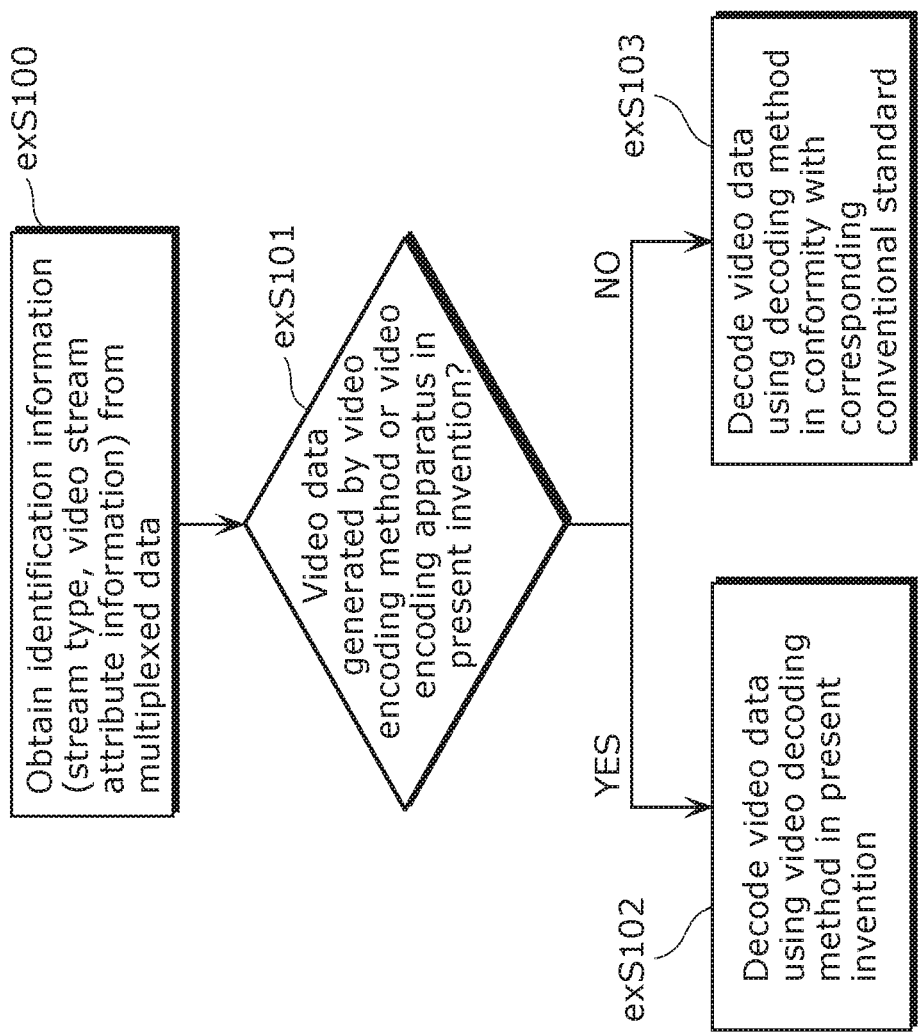
FIG. 30 shows steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 5

Figure 31:
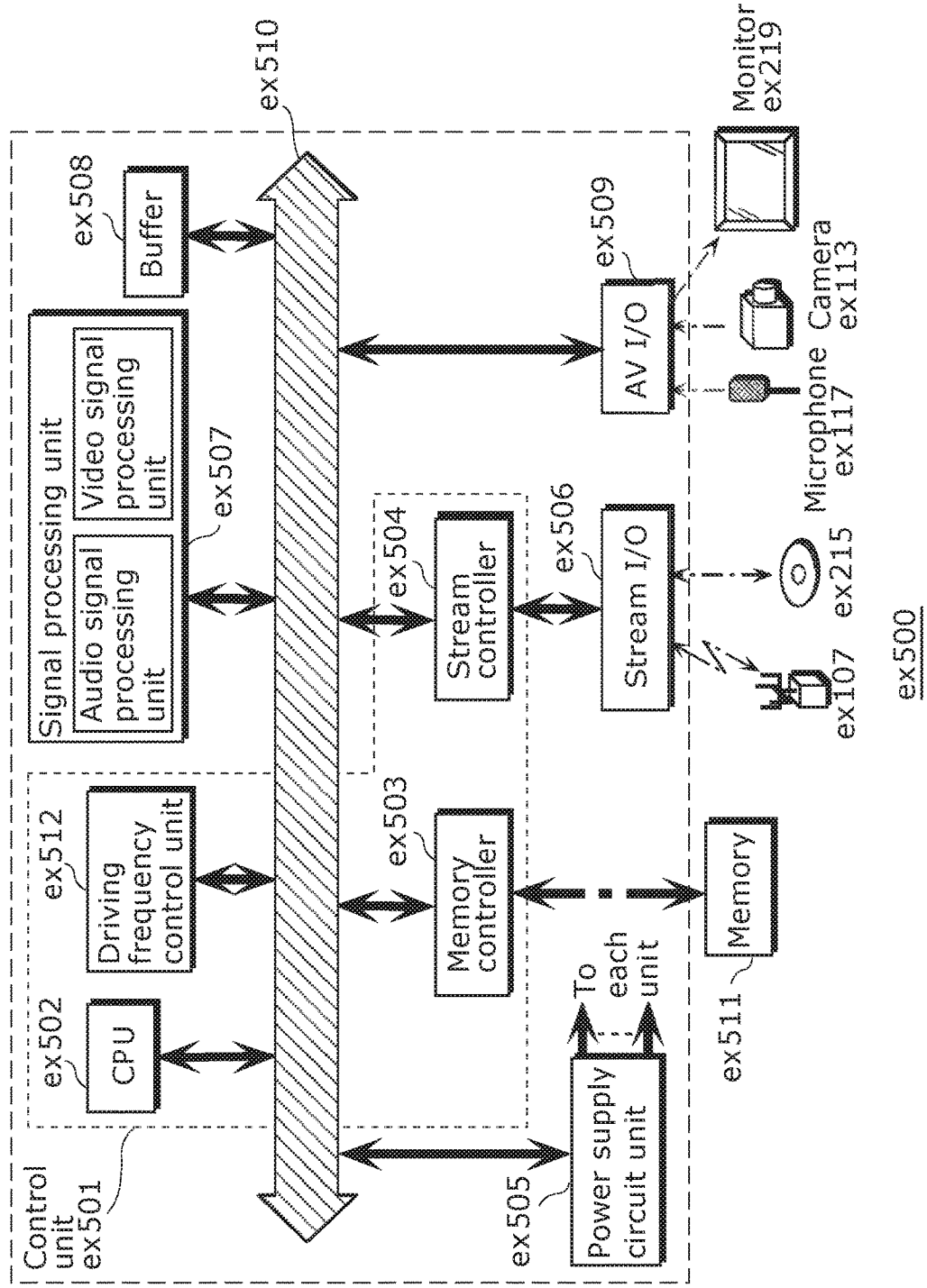
FIG. 31 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, there is a problem that the power consumption increases when the driving frequency is set higher.

Figure 32:
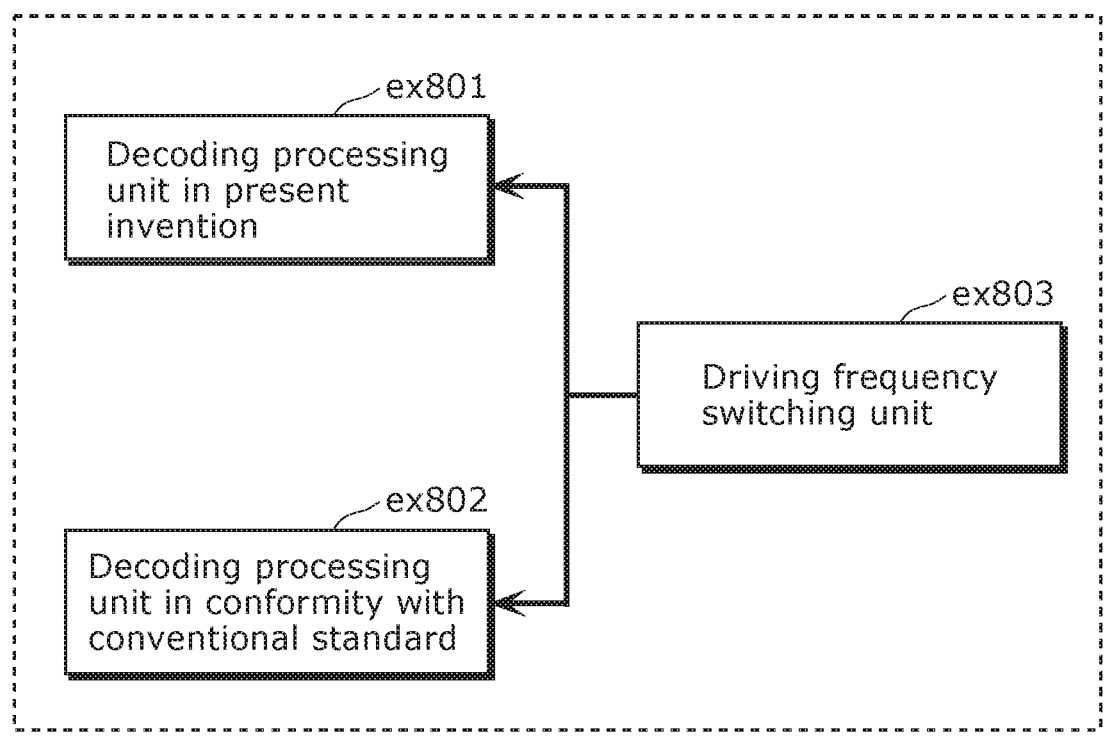
FIG. 32 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

Figures 34, 35A:
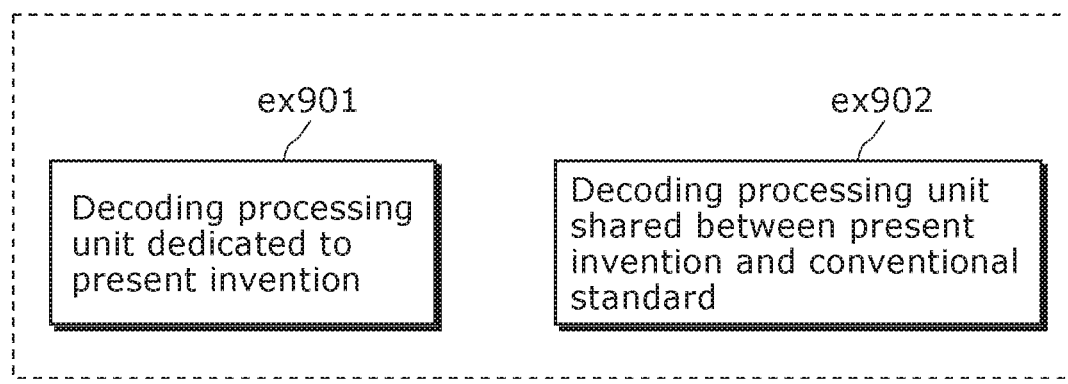
FIG. 34 shows an example of a look-up table in which video data standards are associated with driving frequencies.
FIG. 35A is a diagram showing an example of a configuration for sharing a module of a signal processing unit.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
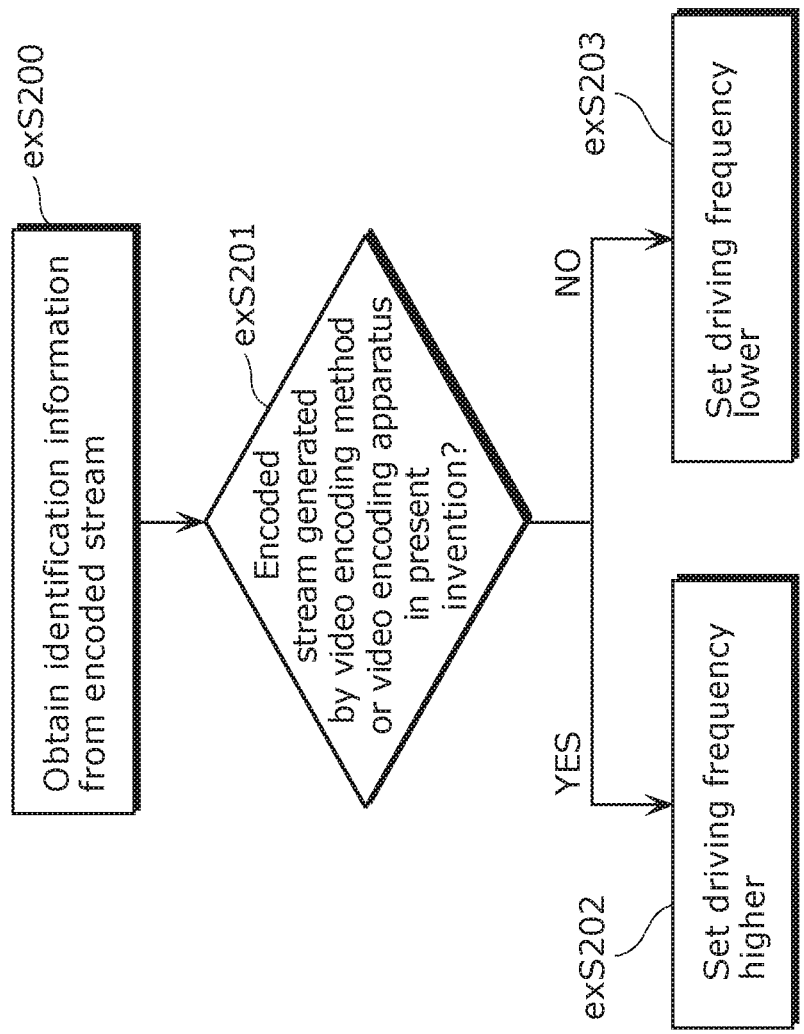
FIG. 33 shows steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present invention and does not conform to MPEG-4 AVC. Since the aspect of the present invention is characterized by system decoder processing in particular, for example, the dedicated decoding processing unit ex901 is used for system decoder processing. Otherwise, the decoding processing unit is probably shared for one of the entropy decoding, deblocking filtering, motion compensation, and inverse quantization, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 35B:
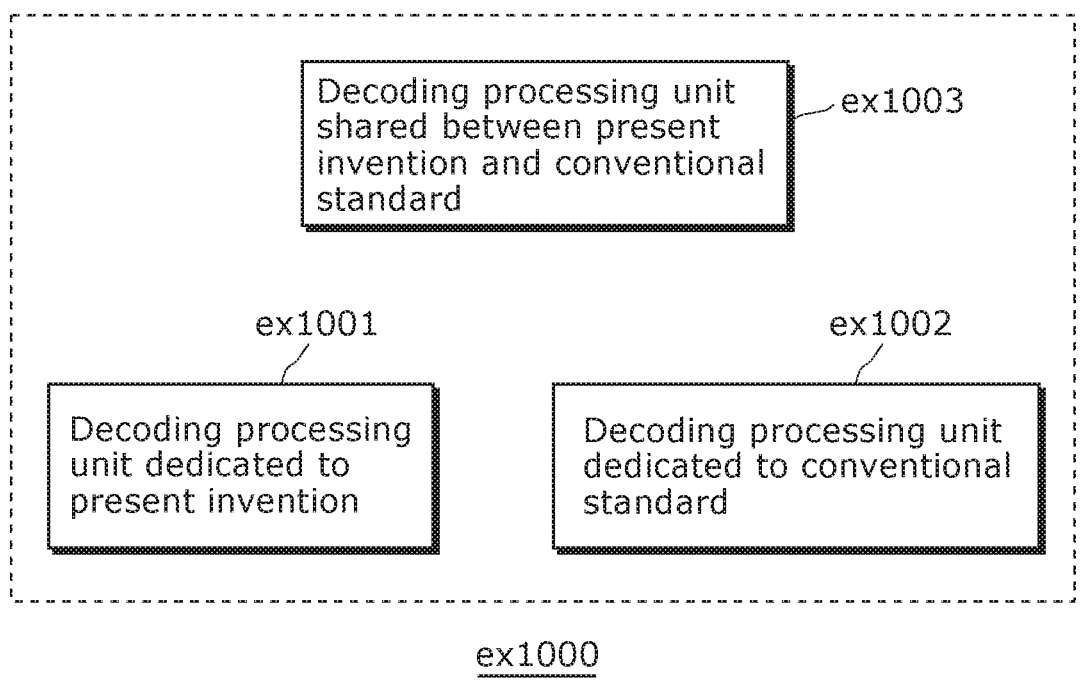
FIG. 35B is a diagram showing another example of a configuration for sharing a module of the signal processing unit.

Furthermore, ex1000 in FIG. 35B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The present invention is applicable to, for example, television receivers, digital video recorders, car navigation systems, mobile telephones, digital cameras, digital video cameras, etc.

REFERENCE SIGNS LIST

100 Spatial scalable image encoding device
101, 201, 401 Input image control unit
102 Downsampling unit
103 Base layer encoding unit
104 Expanding unit
105 Enhancement layer encoding unit
200, 301 Multiview image encoding device
202 Base view encoding unit
203 Enhancement view encoding unit
300 Transmission side system
302, 500 MPEG-2 system encoder
400 Spatial scalable multiview video encoding device
402 First downsampling unit
403 Base view base layer encoding unit
404 Base view enhancement layer encoding unit
405 First expanding unit
406 Second downsampling unit
407 Enhancement view base layer encoding unit
408 Enhancement view enhancement layer encoding unit
409 Second expanding unit
501 Sub-bitstream generating unit
502 Descriptor generating unit
600 MPEG-2 system decoder
601 TS packet receiving unit
602 Descriptor parsing unit
603 Sub-bitstream control unit

The invention claimed is:
1. An image encoding and decoding method including an image encoding method and an image decoding method;
the image encoding method comprising:
generating a plurality of second sub-bitstreams from a plurality of first sub-bitstreams, the plurality of first sub-bitstreams (i) being obtained by encoding a plurality of images on a per layer basis and on a per view basis according to spatial scalable image encoding and multiview image encoding, and (ii) corresponding to a plurality of layers and a plurality of views, each of the plurality of second sub-bitstreams including at least one of the plurality of first sub-bitstreams corresponding to at least one of the plurality of layers and at least one of the plurality of views, and the plurality of second sub-bitstreams being different from the plurality of first sub-bitstreams; and
generating, for each of the plurality of second sub-bitstreams, a descriptor, which includes a first field indicating a minimum value for at least one layer identifier indicating the at least one of the plurality of layers, a second field indicating a maximum value for the at least one layer identifier, a third field indicating a minimum value for at least one view identifier indicating the at least one of the plurality of views, and a fourth field indicating a maximum value for the at least one view identifier, and
the image decoding method comprising:
obtaining a second sub-bitstream in a plurality of second sub-bitstreams and a descriptor of the second sub-bitstream from a bitstream including a plurality of first sub-bitstreams, the plurality of first sub-bitstreams (i) being obtained by encoding a plurality of images on a per layer basis and on a per view basis according to spatial scalable image encoding and multiview image encoding, and (ii) corresponding to a plurality of layers and a plurality of views, each of the plurality of second sub-bitstreams including at least one of the plurality of first sub-bitstreams corresponding to at least one of the plurality of layers and at least one of the plurality of views, and the plurality of second sub-bitstreams being different from the plurality of first sub-bitstreams;
parsing the descriptor, which includes a first field indicating a minimum value for at least one layer identifier indicating the at least one of the plurality of layers, a second field indicating a maximum value for the at least one layer identifier, a third field indicating a minimum value for at least one view identifier indicating the at least one of the plurality of views, and a fourth field indicating a maximum value for the at least one view identifier; and
determining a process to be performed on the second sub-bitstream corresponding to the descriptor, based on the minimum value indicated by the first field, the maximum value indicated by the second field, the minimum value indicated by the third field, and the maximum value indicated by the fourth field.

2. An image encoding and decoding device including an image encoding device and an image decoding device;

the image encoding device comprising:
control circuitry; and
storage which is electrically connected to the control circuitry,
wherein the control circuitry executes the steps of:
generating a plurality of second sub-bitstreams from a plurality of first sub-bitstreams, the plurality of first sub-bitstreams (i) being obtained by encoding a plurality of images on a per layer basis and on a per view basis according to spatial scalable image encoding and multiview image encoding, and (ii) corresponding to a plurality of layers and a plurality of views, each of the plurality of second sub-bitstreams including at least one of the plurality of first sub-bitstreams corresponding to at least one of the plurality of layers and at least one of the plurality of views, and the plurality of second sub-bitstreams being different from the plurality of first sub-bitstreams; and
generating, for each of the plurality of second sub-bitstreams, a descriptor, which includes a first field indicating a minimum value for at least one layer identifier indicating the at least one of the plurality of layers, a second field indicating a maximum value for the at least one layer identifier, a third field indicating a minimum value for at least one view identifier indicating the at least one of the plurality of views, and a fourth field indicating a maximum value for the at least one view identifier, and the image decoding device comprising:
control circuitry; and
storage which is electrically connected to the control circuitry,
wherein the control circuitry executes the steps of:
obtaining a second sub-bitstream in a plurality of second sub-bitstreams and a descriptor of the second sub-bitstream from a bitstream including a plurality of first sub-bitstreams, the plurality of first sub-bitstreams (i) being obtained by encoding a plurality of images on a per layer basis and on a per view basis according to spatial scalable image encoding and multiview image encoding, and (ii) corresponding to a plurality of layers and a plurality of views, each of the plurality of second sub-bitstreams including at least one of the plurality of first sub-bitstreams corresponding to at least one of the plurality of layers and at least one of the plurality of views, and the plurality of second sub-bitstreams being different from the plurality of first sub-bitstreams;
parsing the descriptor, which includes a first field indicating a minimum value for at least one layer identifier indicating the at least one of the plurality of layers, a second field indicating a maximum value for the at least one layer identifier, a third field indicating a minimum value for at least one view identifier indicating the at least one of the plurality of views, and a fourth field indicating a maximum value for the at least one view identifier; and
determining a process to be performed on the second sub-bitstream corresponding to the descriptor, based on the minimum value indicated by the first field, the maximum value indicated by the second field, the minimum value indicated by the third field, and the maximum value indicated by the fourth field.

* * * * *